(12) United States Patent
Kaler et al.

(10) Patent No.: US 8,359,595 B2
(45) Date of Patent: *Jan. 22, 2013

(54) GENERIC APPLICATION SERVER AND METHOD OF OPERATION THEREFOR

(75) Inventors: Christopher G. Kaler, Redmond, WA (US); Steven J. Kruy, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 1525 days.

This patent is subject to a terminal disclaimer.

(21) Appl. No.: 11/342,453

(22) Filed: Jan. 30, 2006

(65) Prior Publication Data

US 2006/0136930 A1    Jun. 22, 2006

Related U.S. Application Data

(63) Continuation of application No. 09/717,675, filed on Nov. 21, 2000, now Pat. No. 7,051,330.

(51) Int. Cl.
*G06F 9/46* (2006.01)
*G06F 15/16* (2006.01)

(52) U.S. Cl. ......... 718/102; 718/100; 718/103; 709/203

(58) Field of Classification Search .................. 718/100, 718/101, 102, 103, 106, 104, 105, 107; 709/203
See application file for complete search history.

(56) References Cited

U.S. PATENT DOCUMENTS

| | | | | |
|---|---|---|---|---|
| 5,901,334 | A |  | 5/1999 | Banks et al. .................. 395/876 |
| 6,026,413 | A |  | 2/2000 | Challenger et al. ........... 707/202 |
| 6,085,215 | A |  | 7/2000 | Ramakrishnan et al. ..... 709/102 |
| 6,108,743 | A | * | 8/2000 | Debs et al. .................... 710/240 |
| 6,138,141 | A | * | 10/2000 | DeSimone et al. ........... 709/203 |
| 6,157,927 | A |  | 12/2000 | Schaefer et al. .......... 707/103 R |
| 6,219,353 | B1 |  | 4/2001 | Wight et al. .................. 370/425 |
| 6,226,689 | B1 |  | 5/2001 | Shah et al. .................... 709/314 |
| 6,327,607 | B1 |  | 12/2001 | Fant .............................. 709/201 |
| 6,385,659 | B1 | * | 5/2002 | Tuel, Jr. ........................ 719/313 |
| 6,412,018 | B1 | * | 6/2002 | Tuel, Jr. ........................ 719/313 |
| 6,421,676 | B1 | * | 7/2002 | Krishnamurthy et al. ............ 1/1 |
| 6,430,616 | B1 | * | 8/2002 | Brinnand et al. ............. 709/224 |
| 6,457,064 | B1 |  | 9/2002 | Huff et al. .................... 709/318 |

(Continued)

OTHER PUBLICATIONS

Hu et al. "Measuring the Impact of Event Dispatching and Concurrency Models on Web Server Performance Over High-speed Networks" Proceedings of the 2nd Global Internet mini-conference, Nov. 1997, pp. 1-12.*

*Primary Examiner* — Emerson Puente
*Assistant Examiner* — Willy W Huaracha
(74) *Attorney, Agent, or Firm* — Woodcock Washburn LLP

(57) ABSTRACT

A generic application server is capable of simultaneously receiving requests, processing requested work, and returning results using multiple, conceptual thread pools. In addition, functions are programmable as state machines. While executing such a function, when a worker thread encounters a potentially blocking condition, the thread issues an asynchronous request for data, a state transition is performed, and the thread is released to do other work. After the blocking condition is relieved, another worker thread is scheduled to advance to the next function state and continue the function. Multiple priority work queues are used to facilitate completion of functions already in progress. In addition, lower-priority complex logic threads can be invoked to process computationally intense logic that may be necessitated by a request. Throttling functions are also implemented, which control the quantity of work accepted into the server and server response time.

10 Claims, 16 Drawing Sheets

U.S. PATENT DOCUMENTS

| | | | |
|---|---|---|---|
| 6,510,214 B1 | 1/2003 | McDaniel | 379/134 |
| 6,542,921 B1 | 4/2003 | Sager | 709/108 |
| 6,625,654 B1 | 9/2003 | Wolrich et al. | 709/230 |
| 6,633,914 B1 * | 10/2003 | Bayeh et al. | 709/227 |
| 6,658,462 B1 * | 12/2003 | Dutta | 709/219 |
| 6,665,704 B1 | 12/2003 | Singh | 709/203 |
| 6,697,835 B1 | 2/2004 | Hanson et al. | 709/201 |
| 7,549,151 B2 * | 6/2009 | Zhou et al. | 719/313 |
| 2004/0068479 A1 * | 4/2004 | Wolfson et al. | 707/1 |

* cited by examiner

GENERIC APPLICATION SERVER AND METHOD OF OPERATION THEREFOR

CROSS REFERENCE TO RELATED APPLICATIONS

This application is a continuation of U.S. application Ser. No. 09/717,675, filed Nov. 21, 2000, entitled "Generic Application Server and Method of Operation Therefor", which is hereby incorporated by reference in its entirety.

TECHNICAL FIELD

The invention relates generally to application servers and, more particularly, to applications servers that process work using threads in a multi-processor environment.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright (D 1998, Microsoft Corporation, All Rights Reserved.

BACKGROUND OF THE INVENTION

Generic application servers can be used to provide many different types of services to the client computers that access them. For example, a generic application server can be used to authenticate users, view server files, provide access to data within one or more databases, manage e-mail, and provide access to Web sites, among other things. Depending on network needs, special purpose servers also can be used to provide each of these types of services, rather than employing a generic application server. Essentially, a server is an entity that receives requests from clients, and responds to those requests by providing some type of service.

A symmetric multiprocessing (SMP) server is a server that operates on a multi-processor computer, where multiple server functions can be simultaneously performed using multiple central processing units ("CPUs"). In the following description, references to a "server" are generally directed to SMP-type servers, but some of the concepts can also be applied to single CPU systems.

Servers can interface with a variety of operating systems, including, for example, MICROSOFT® WINDOWS® or UNIX operating systems, and variants thereof. Some servers are designed to run on "treaded" operating systems, such as MICROSOFT WINDOWS NT®. A "thread," also referred to as a "lightweight process," is an entity that the operating system schedules for execution on a CPU. A thread invokes executable code, such as various application-specific handlers, and may include, among other things, the contents of a set of registers representing the state of the CPU, one or more stacks, and a private storage area. The application-specific handlers include and/or invoke data and business service procedures that have been written by a developer for a particular application. A server that runs in such an environment can take advantage of the operating system's threaded nature to reduce the complexity of the server and to perform dynamic load balancing. Examples of servers that run with a threaded operating system include MICROSOFT SQL SERVER™, MICROSOFT INTERNET INFORMATION SERVICES™ ("IIS"), and many other servers. These servers are designed to interact with the WIDOWS environment, issuing various documented operating system calls that, in turn, make any device driver calls that are necessary to process incoming client requests.

Like the operating system on which they are run, many servers perform the requested work by running threads, which may, in turn, invoke execution of operating system threads. Some prior art servers use a dedicated receiver thread that listens for incoming requests from clients. When a request is received, the receiver thread places a work item in a queue. A thread from a pool of worker threads then picks up the work item and processes it. In some systems, the worker thread sends the results of the request to the client. In other systems, the worker thread sends the results to a dedicated reply thread, which in turn sends the results to the client.

Each worker thread may be in one of several states of execution. FIG. 1 illustrates a state diagram showing worker thread execution states in accordance with the prior art. Worker threads are first created 100 and initialized 102 by the server. In some servers, threads are created (and destroyed) depending on system activity, where the number of active threads varies depending on system activity and configuration.

After a thread is created and initialized, the thread is placed in a ready state 104. When the server receives a client request, the receiver thread posts the incoming request in a communication port between the receiver and worker threads. For example, the system may have a "completion port," which includes multiple I/O ports within which data is exchanged between the server computer, client computers, and the database, among other things. When run in the WINDOWS environment, the completion port could be an "I/O Completion Port," which is a WINDOWS NT facility.

When the completion port indicates that work is available, a worker thread in the ready state 104 is scheduled to processes the request. After a standby period, that thread then enters the running state 106. If no worker thread is available to process for the next incoming request, a new thread is created, up to some maximum thread limit, and the new thread is placed in the ready state 104. Each thread is scheduled on an idle CPU. If all CPUs are busy, the server's scheduler may wait or may preempt another running thread, as is described below.

As indicated above, in some systems, a "pool" of worker threads is available to the system. FIG. 2 illustrates a simplified block diagram of a server 200 that uses a pool 202 of worker threads to process requests received from clients in accordance with the prior art. In such systems, after the receiver thread receives an incoming request, a reference is placed in a pending work queue or the completion port 204, indicating that work is available. The next thread in the worker thread pool 202 executes the available work. The worker thread 202 can be scheduled to run on any of multiple CPUs 206 available to the server. Because multiple CPUs 206 are available to execute operating system and server threads, these types of systems are actually multi-tasking systems, meaning that multiple threads can be active on the system at any given time. Under the pooling scheme, a single worker thread runs a particular user request to completion. Occasionally, however, a particular thread's execution of a request may be interrupted when it performs an operation that "blocks." That thread then enters a waiting state 110. The operating system may then give the blocked thread's remaining quantum, described below, to another thread. The waiting thread does not run again until it is re-scheduled by the operating system, which typically does not occur until the blocking operation completes or until a timeout established for the operation has expired.

Some commonly encountered blocking operations include, for example, reading or writing data on disk, accessing a database, or reading or writing on the network.

Requests that cause blocking conditions to occur can take substantially longer than a normal memory accesses, because a physical I/O (e.g., a read from disk) can take thousands of times longer than reading local system memory.

Besides having its execution interrupted by a blocking operation, a thread may also be periodically interrupted by the system in order to give sufficient CPU access to all waiting threads. This is done, in some systems, by the system allocating a unit of time, commonly referred to as a "quantum," to each running thread. When a running thread's quantum expires, the thread is placed in the waiting state 110, and another thread is scheduled to run on the CPU. Typically, the interrupted thread enters the waiting state 110 by being placed on a first-in, first-out wait queue, along with any other threads that are waiting to execute on a CPU. When the interrupted thread reaches the head of the queue, its execution is resumed by a CPU. This type of scheduling is referred to generally as "pre-emptive" scheduling, since running threads are pre-empted by other threads waiting to execute.

While transferring a thread to the waiting state 110 due to a blocking operation or quantum expiration, the system performs a context switch, which is an operation that saves the volatile machine state of a running thread from the CPU, loads the volatile machine state of a new thread onto the CPU, and begins executing the new thread. In most cases, the new thread is the next thread waiting to be executed on the wait queue.

When a particular thread has completed the request it was assigned to perform, the worker thread is terminated 108. When needed to perform a new request, the thread would then be re-initialized 102, and placed back in the ready state 104. Alternatively, the thread may be completely deleted, and must be recreated and re-initialized before it can be used again.

As indicated above, a dedicated thread is assigned to complete each user request, and that thread may be interrupted multiple times due to blocking operations or quantum expirations. Thus, the amount of time a thread takes to complete each request is approximately the sum of the time to create and initialize a new thread for the request, the time to actually perform the requested work, the time to perform any necessary context switches, and the time that the thread waits on the ready and wait queues. Because of the overhead inherent in these systems, fewer cycles are dedicating to actually performing the requested work, and the CPU's instruction and data caches may be adversely impacted. Performance can also be impacted by the effect of context switching on the underlying hardware. These operations can flush internal caches, causing additional delays while fetching data from memory.

Another aspect of prior art servers is that they wait to receive all requested client data before performing a requested operation. In addition, these servers could wait for an entire result set to be ready before returning results to a client. Thus, server response time may be relatively slow for requests that correspond to large data sets.

A generic or special purpose server may provide data related services and business services, among other things. These business services apply application-specific business rules and logic to data identified in a client request. For example, business services could include services such as adding a customer order to the database or checking a customer's credit availability. Alternatively, a request could take a long time to process, such as a request that asks the server to search for a short string in a large file, for example.

When a worker thread invokes long-running or computationally intense business logic, the CPU upon which the thread is running will be unavailable for use by other worker threads for a relatively long period of time. Thus, unless the worker thread is pre-empted, execution of such logic by the worker thread can result in reduced system throughput and response time, since the CPU performing the business logic is not performing other data services. This also ties up server resources if the thread is blocked when there is other work that could be done.

One solution may be to perform some or all of the long-running or computationally intense logic at the client. However, deploying those business services at the client generally means more network traffic, because the data has to be moved to the client to make the decisions coded in the business logic.

The prior art thread pool designs can be efficient for handling numerous active connections between clients and a database. However, some requests may cause lengthy blocking conditions to be encountered or may invoke computationally intense business logic, thus tying up CPU resources and causing system performance to be degraded. Thus, in some cases or under some conditions, the server acts as a bottleneck between the client and the database.

CPU availability affects the performance of an SMP server. Response time and throughput are two common measurements that are used to evaluate the performance of such a server, although other measurements are often used as well. Response time is the time it takes to return the first portion of a result to a client. For example, after a user of a client computer presses the "Enter" key, thus causing the client to send a request to the server, the response time is the amount of time it takes for the first portion of the requested results to be returned to the client and displayed to the user on the client's monitor. In contrast, the throughput time is the amount of time it takes for the entire result to be returned to the client computer.

Occasionally, a server may have so much work to process, that its response times and/or throughput become unacceptable. This condition may be the result of receiving many more queries than the system can handle efficiently, and/or the result of processing requests that cause lengthy blocking conditions or include computationally intense logic.

What is needed is a server that receives and processes work requests and returns results in a highly efficient manner. What is further needed is a server having response times and throughput that are not adversely affected by predictable blocking conditions, or complex or long-running business logic. What is further needed is a server that efficiently monitors and adjusts the work being performed by the server, resulting in acceptable system performance. Finally, what is needed is a server for which application designers can readily design new applications and enhance existing applications.

SUMMARY OF THE INVENTION

An application server services requests from one or more client computers by maintaining a pool of identical threads. Each thread can invoke at least one receive handler, at least one work handler, and at least one reply handler. After a request is received from a client computer, the request is processed by a receive handler invoked by a first thread. This first thread creates a work item that specifies a task to be performed by a work handler that is invoked by a second thread. When a result of performing the task is received, at least a portion of the result is returned to the client computer by a reply handler invoked by a third thread. The first, second, and third threads can be the same threads or different threads.

The request received from the client computer may be a request to perform a multi-state function. If so, a first thread invokes a first work handler to perform a first task associated with a first state of the multi-state function. The first task may include issuing an asynchronous request for data. When the data specified in the asynchronous request is received, a second thread invokes a second work handler to perform a second task associated with a second state of the multi-state function, where the second task may perform an operation on the data Again, the first and second threads can be the same thread or different threads.

The method can also include the ability to monitor a quantity of work being performed by the computer system, and to determine whether the quantity has exceeded an upper limit. If the quantity has exceeded the upper limit but has not dropped below a lower limit, new requests are not accepted into the computer system.

The method can also include the ability to monitor an amount of time to return a result by the computer system, and to determine whether the amount of time has exceeded an upper limit. If the amount of time has exceeded the upper limit but has not dropped below a lower limit, new work items are not processed.

DETAILED DESCRIPTION

Embodiments of the present invention provide a generic application server, which services requests from client computers by efficiently using system resources. The server uses multiple, conceptual thread pools to simultaneously receive requests, process work, and return results in an efficient manner. The three conceptual thread pools include receive threads which receive and process client requests, worker threads which perform the requested work, and reply threads which return results to the requesting client.

In one embodiment, functions implemented by worker threads can be programmed as state machines. Thus, a worker thread can be programmed so that, when the thread encounters a potentially blocking condition (e.g., a request for data from disk) within the function, the thread sends an asynchronous request for the data, and the thread is released to do other work. After the blocking condition is relieved (e.g., the server receives the requested data), another (or possibly the same) worker thread advances to the next function state and continues the function.

In one embodiment, server performance is enhanced by using multiple priority-based work queues to facilitate completion of functions already in progress. In addition, the server can invoke complex logic threads, in one embodiment, to process computationally intense or long-running business logic that may be required by a request.

In one embodiment, the complex logic threads are run at lower priorities than the worker threads, even though they are guaranteed some minimum system resource. Throttling functions are also implemented, in various embodiments, which control the quantity of work accepted into the server and also server throughput.

After describing, in conjunction with FIG. 3, an example of an operating environment in which the invention may be practiced, a generic application server and method of its operation in accordance with various embodiments will be discussed in detail in conjunction with FIGS. 4-16.

Operating Environment Example

Figure 3:
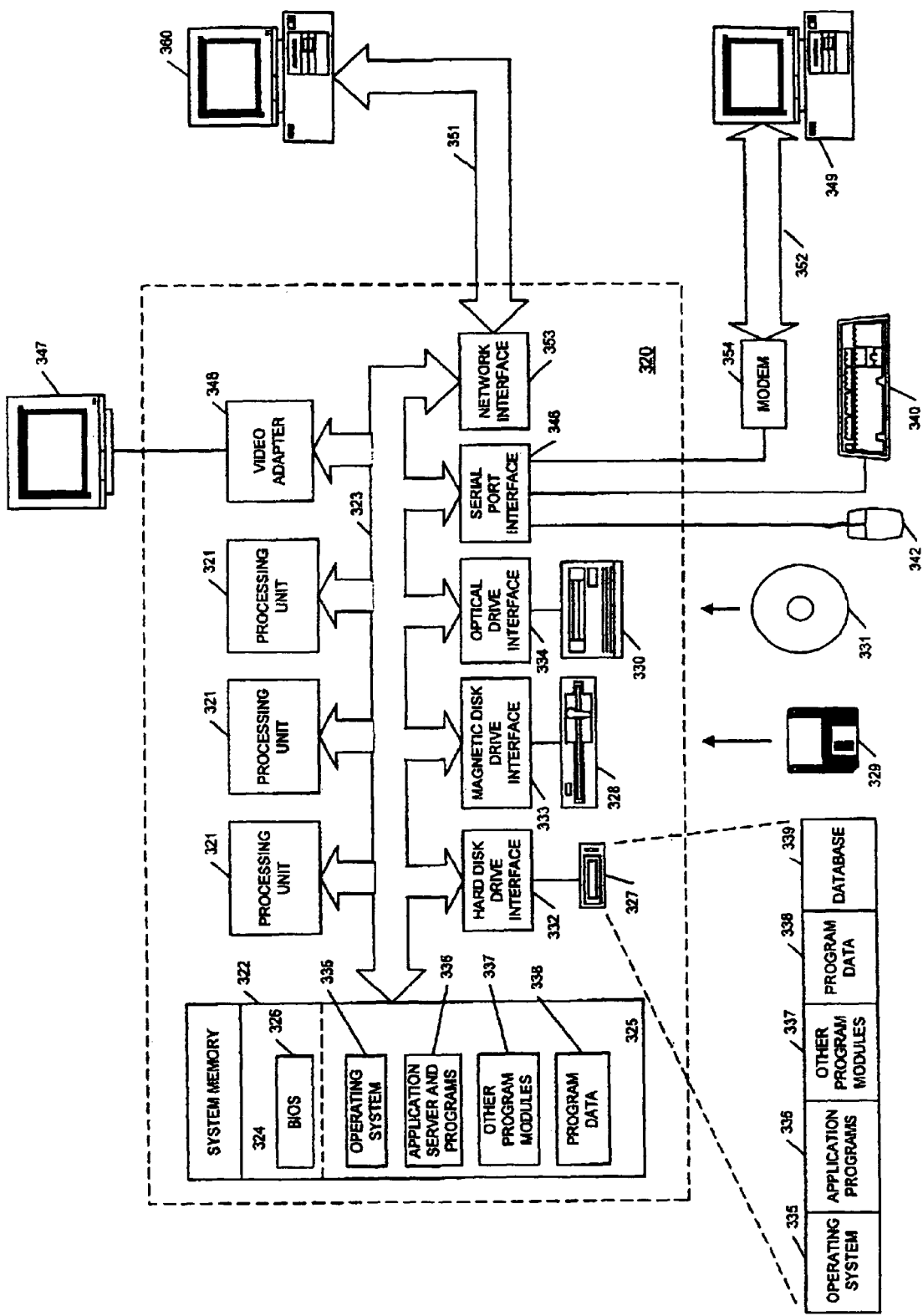
FIG. 3 illustrates a block diagram of a computer system in accordance with one embodiment of the present invention.

FIG. 3 illustrates a block diagram of a computer system in accordance with one embodiment of the present invention. FIG. 3 and the following discussion are intended to provide a brief, general description of a suitable computing environment in which the invention may be implemented. Although not required, the invention will be described in the general context of computer-executable instructions, such as program modules, being executed by a computer. Generally, program modules include routines, programs, objects, components, data structures, etc., which perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The system shown in FIG. 3 includes a general purpose computing device in the form of a computer 320, including multiple processing units 321, a system memory 322, and a system bus 323 that couples various system components including the system memory 322 to processing units 321. The multiple processing units 321, or CPUs, enable computer 320 to perform symmetric multiprocessing of server functions, and other functions. In one embodiment, computer 320 may include only a single processing unit 321. Although three processing units 321 are shown in FIG. 3, computer 320 may include more or fewer processing units 321.

As used herein, the terms "CPU," "processor," and "processing unit" mean a central processing unit accessible to the server. Generally, the processing units referred to herein are associated with the same computer that hosts the server, although an available processing unit also could reside in a computer (e.g., computers 349, 360) connected to the server over a network connection. FIG. 3 illustrates processing units 321 as residing in the same computer as the server. This is not intended to require the processing units to reside in the same computer. Instead, some or all of the processing units can reside in one or more separate computers.

The system bus 323 may be any of several types of bus structures including a memory bus or memory controller, a peripheral bus, and a local bus using any of a variety of bus architectures. The system memory includes read only memory (ROM) 324 and random access memory (RAM) 325. A basic input/output system 326 (BIOS), containing the basic routines that help to transfer information between elements within the computer 320, such as during start-up, is stored in ROM 324.

The computer 320 further includes a hard disk drive 327 for reading from and writing to a hard disk, not shown, a magnetic disk drive 328 for reading from or writing to a removable magnetic disk 329, and an optical disk drive 330 for reading from or writing to a removable optical disk 331, such as a CD ROM or other optical media. The hard disk drive 327, magnetic disk drive 328, and optical disk drive 330 are connected to the system bus 323 by a hard disk drive interface 332, a magnetic disk drive interface 333, and an optical drive interface 334, respectively.

The drives and their associated computer-readable media provide nonvolatile storage of computer readable instructions, data structures, program modules and other data for the computer 320. Although the exemplary environment described herein employs a hard disk, a removable magnetic disk 329, and a removable optical disk 331, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules and data structures may be stored on the hard disk, magnetic disk 329, optical disk 331, ROM 324 or RAM 325, including an operating system 335, an application server, including one or more application programs 336, other program modules 337, program data 338, and database 339. The application server receives requests from a user of computer 320 and/or from remote computers 349, 360, processes those requests using processing units 321, and returns results to the requester.

Modules associated with the application server are executed in conjunction with operating system 335. In one embodiment, the server interacts with the operating system in a user mode, rather than a kernel mode, and the server makes only documented calls to the operating system. It is then the operating system's responsibility to make all calls to those device drivers that are necessary to execute the server's work. In alternate embodiments, the server can make undocumented calls to the operating system, and/or can interface directly with device drivers.

A user may enter requests and information into the computer 320 through input devices, such as a keyboard 340, pointing device 342, or other input devices (not shown). These and other input devices are often connected to processing units 321 through a serial port interface 346 that is coupled to the system bus, but may be connected by other interfaces, such as a parallel port, game port or a universal serial bus (USB). A monitor 347 or other type of display device is also connected to the system bus 323 via an interface, such as a video adapter 348. In addition to the monitor, computers typically include other peripheral output devices (not shown), such as speakers and printers.

The computer 320 may operate in a networked environment using logical connections to one or more remote computers, such as a remote computers 349, 360. Remote computers 349, 360 may be other computers, clients, servers, routers, network PCs, peer devices or other common network nodes, and typically includes many or all of the elements described above relative to the computer 320. The logical connections depicted in FIG. 3 include a local area network (LAN) 351 and a wide area network (WAN) 352. Such networking environments are commonplace in offices, enterprise-wide computer networks, intranets, and the Internet.

When used in a LAN networking environment, the computer 320 is connected to the local network 351 through a network interface or adapter 353. When used in a WAN networking environment, the computer 320 typically includes a modem 354 or other means for establishing communications over the WAN 352. The modem 354, which may be internal or external, is connected to the system bus 323 via the serial port interface 346. In a networked environment, program modules depicted relative to the computer 320, or other portions thereof, may be stored in the remote memory storage device. It will be appreciated that the network connections shown are exemplary and other means of establishing a communications link between the computers may be used.

One or more of computers 349, 360 could include a database engine that provides access to one or more databases. In addition, one or more of computers 349, 360 could be client computers that request, from computer 320, access to data stored on hard disk 327, system memory 322, or another local or remote database. These client computers also could provide data to computer 320 to store on hard disk 327, system memory 322, or another local or remote data storage device.

Those of skill in the art will understand, based on the description herein, that numerous system configurations could be used to implement the method of the present invention. Accordingly, all such configurations are intended to fall within the scope of the present invention.

Generic Application Server and Method of Operation

In one embodiment of the present invention, threads within multiple, conceptual thread pools simultaneously receive data and/or work requests, perform requested work, and return results. The server supports execution of functions, implemented by worker threads, which are written as state machines, in one embodiment. When a potentially blocking request is encountered, the worker thread sends an asynchronous request, and the thread is thereafter freed to do other work.

This provides several advantages over prior art systems. In various embodiments of the present invention, as will be described in detail below, the server knows when an asynchronous request has been completed, and it can rapidly resume processing of the associated function. Unlike the prior art, threads do not wait on the completion of each asynchronous activity, and the number of threads entering a wait state is reduced. In addition, wait states are combined, in various embodiments, so that a thread in a wait state could be scheduled upon the completion of multiple different asynchronous requests. Accordingly, the number of context switches is reduced, using embodiments of the present invention. When forward progress can be made anywhere in the server, the server drives the number of waiting threads toward zero. Because the number of context switches are reduced in this embodiment, the total number of threads also can be reduced.

As used herein, the term "thread" means any entity that an operating system or the server schedules for execution on a CPU. The use of the term is not intended to limit the invention to use in the WINDOWS operating system environment. Rather, the concepts described herein could apply to any lightweight process or other type of executable entity that is used to perform server functions in conjunction with an operating system, including threaded or non-threaded operating systems now or hereinafter in existence.

In addition, the terms "receiver thread," "worker thread," and "reply thread" are used in this description. In one embodiment, each of these terms actually refer to a generic thread that can invoke any of multiple types of application-specific handlers (e.g., receive handlers, work handlers, and reply handlers) at various times. Thus, for ease of description, rather than referring to "a generic thread that invokes a receive handler," the description instead refers to "a receiver thread," for example. This semantic is used also for generic threads that invoke work handlers and reply handlers, referred to respectively as "worker threads" and "reply threads."

In one embodiment, the server maintains a pool of multiple generic threads. Each generic thread is identical, in one embodiment, and each can invoke one or more receive handlers, work handlers, and reply handlers. The particular handler executed at any one time depends on the type of receive, work, or reply task that the thread has been tasked to perform. For example, each thread may be able to invoke several different receive handlers, each of which performs a different application-specific task. A particular one of the multiple receive handlers may be invoked if the request asks the server to get a file, for example. The particular receive handler would process the request, and generate one or more work items that relate to getting the identified file. A different receive handler would be executed, however, if the request asks the server to store a file.

If an application developer would like to create an application program, add functionality to an existing application, or create a new type of system object, the application developer can write various receive, work, reply, and/or complex logic handlers that will enable the system to perform the desired function or manipulate the object. The infrastructure (i.e., the thread and state management) is implemented outside of the application-specific logic. In this way, the server is generic because application developers need only implement their business logic.

Essentially, the application program is defined, at least in part, by at least one receive handler, work handler, and reply handler that can be invoked by a generic thread. In addition, the application program can be defined by at least one complex logic handler that can be invoked by a complex logic thread, as will be described in more detail, below. In one embodiment, the threads that invoke the receive, work, and reply handlers are distinct from the complex logic threads.

Figure 4:
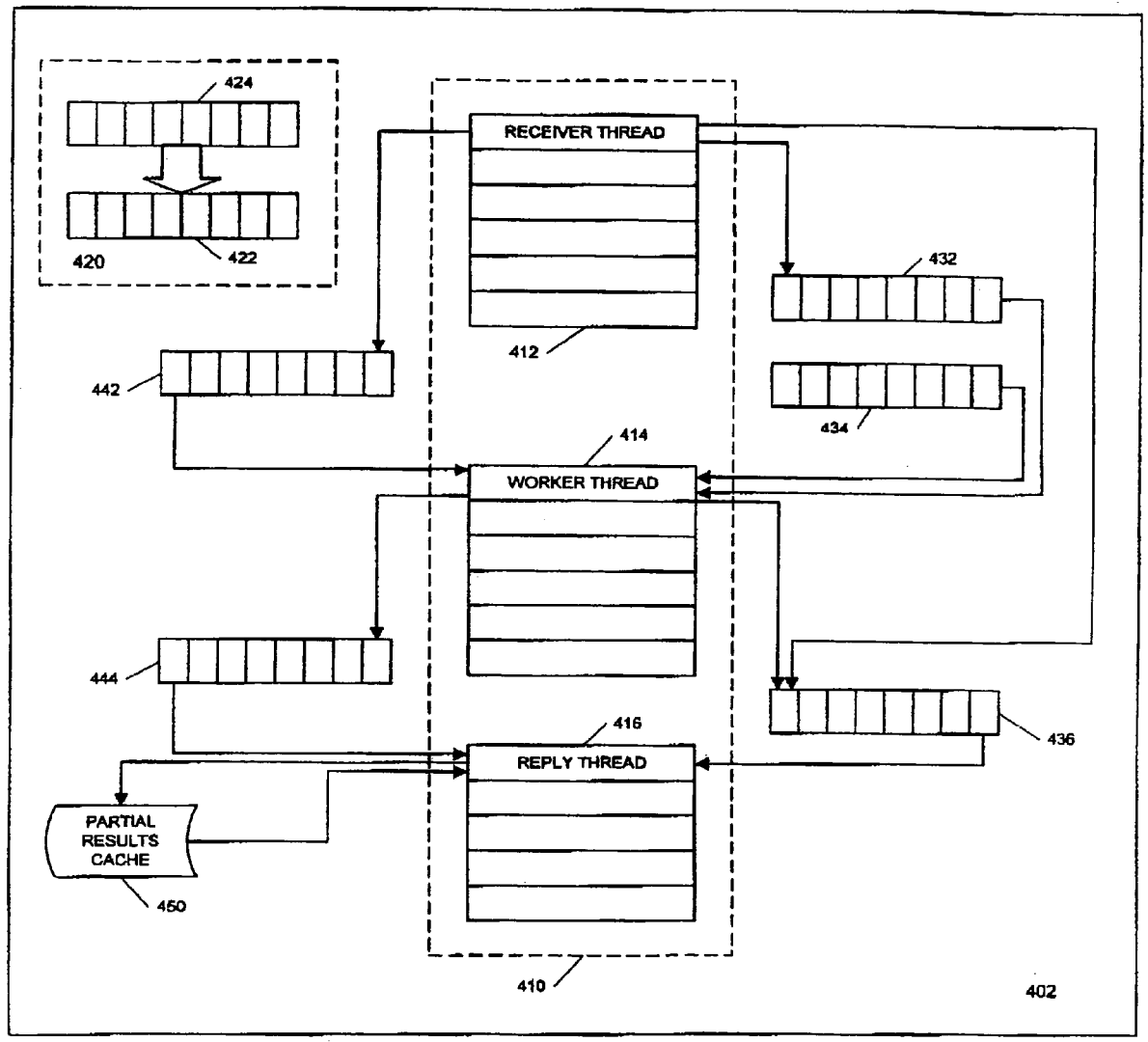
FIG. 4 illustrates a simplified block diagram of a server that uses multiple, conceptual thread pools to service client requests in accordance with one embodiment of the present invention.

FIG. 4 illustrates a simplified block diagram of a generic application server that uses multiple, conceptual thread pools to service client requests in accordance with one embodiment of the present invention. A client request, for example, may ask the server to authenticate a user, access or transfer files or data, send data to another computer, such as a remote database computer or another client, or perform any of a number of other services.

The server is installed on a host computer 402, which receives requests from one or more client computers (not shown) over a network, local procedure call (LPC), remote procedure call (RPC), shared memory or some other request source. In order to perform the requested work, in one embodiment, the server utilizes multiple CPUs (not shown), upon which multiple receiver, worker, reply, and complex logic threads may be simultaneously scheduled and executed. In another embodiment, the server could utilize a single CPU.

Threads executed by host computer 402 perform three main server functions. They receive and parse requests from client computers, they perform the requested work (e.g., data transfer, manipulation or business logic), and they return the results, when appropriate. For example, host computer 402 may receive a request from a client computer that requests a certain set of records from a table stored in the database. After receiving the request, the server would access and retrieve the data from the database. When host computer 402 receives the data from the database computer, host computer 402 then performs any additional data manipulation specified in the request, and returns the records to the client computer.

Alternatively, the client computer may send host computer 402 a request to store a set of records in the database. After receiving the request, host computer 402 would receive the records from the client, and store the data in the database. When the database computer indicates that the data transfer transaction is completed, host computer 402 returns this result to the client computer.

As indicated previously, host computer 402 uses multiple, conceptual thread pools 412, 414, 416 to simultaneously receive requests, perform the requested work, and return the results. In reality, the threads that comprise the multiple, conceptual thread pools are part of a single thread pool 410, in one embodiment, where each thread may act, as needed, as either a receiver thread, a worker thread or a reply thread. For ease of description, however, the thread types and thread pools are described as being distinct from one another.

In one embodiment, the number of receiver, worker, and reply threads 412, 414, and 416 that exist on the server at any one time is in a range from about N+1 to about 2*N, where N is the number of CPUs available to host computer 402. This range of threads is particularly desirable for at least two reasons. First, it is desirable to keep the number of threads close to the number of CPUs. Conceptually, if only one thread is allocated to run on a CPU, then it would be as if that thread had unlimited quantums, and thus the thread would receive unlimited CPU time to execute its request. However, if only one thread per CPU were available, and the thread blocked due to a page fault, for example, then the CPU would be idle until the blocking condition were relieved. Thus, it is desirable to have at least one additional thread. If the system includes about 2*N threads, then about two threads would be available to run at any time on a CPU, and the odds of both threads faulting at the same time would be low. In other embodiments, more or fewer threads than the above range could be used. Using more threads, however, may result in more context switches and cause other server inefficiencies, such as those described in conjunction with prior art systems.

When work is available, the host computer either schedules a new thread for execution on a CPU or tasks an already running but available thread to execute the work, in one embodiment. When necessary, the scheduling function is performed by one or more separate threads, which implement thread managers, in one embodiment. These threads are invoked whenever a reference is placed in a work queue 422 of a completion port 420, as will be described below. In other embodiments, the server could perform some or all of the thread scheduling. When more threads are scheduled than are available CPUs to run them, then pre-emptive thread scheduling can be employed, such as the quantum thread scheduling that is done in prior art systems.

The flow of processing for a client request is as follows. First, a request is received by host computer 402. In one embodiment, each received request includes a header and a block of request specific data, although the request could be in other formats in other embodiments. In one embodiment, the header includes the packet size and a request type identifier. The packet size indicates the number of bytes in the request packet, and the request type identifier indicates the type of request. For example, the request type could be a request to obtain a directory listing, to obtain a file, or to store a file. In addition, in one embodiment, the header includes security information, such as an authentication token and a checksum, for example. In another embodiment, the request may separate the data elements (e.g., via a LPC). In such an embodiment, the data may not be formatted and unformatted in two processes, as described above, but instead may be passed as procedure arguments.

In one embodiment, all requests are received into one of multiple I/O ports 424 that form a part of a completion port 420. For example, an I/O Completion Port, which is a WINDOWS NT facility, can be used as completion port 420. Other operating systems may employ similar input/output facilities, and those facilities could be used in a manner similar to that described below, in various embodiments.

Each of the I/O ports 424 is associated with an interface to a physical device. For example, an I/O port 424 may provide an interface to a network or a hard disk. The operating system knows, based on the status of each I/O port 424 when data has been received from the network or other device, and when the system can write data to the network or other device. The I/O port 424 also includes "work request markers" (also referred to herein as "references"), which signal that data is available in a work queue, as is described in more detail below.

A "work item" is a unit of work that is placed on a work queue (e.g., queues 422, 432, 434, 436, 610, and 614), and which specifies one or more tasks for a thread to perform in order to make progress toward completing a client request or data transfer. When a work item is placed on a queue, a work request marker also is placed in the I/O port 424. The work request marker indicates that one or more work items exist in the work queue (or queues), but it does not identify a specific work item. The work request marker triggers the thread scheduler to schedule a thread. The thread then goes to the work queue 422 (or queues) to pull the next, prioritized work item.

As indicated previously, each generic thread can invoke any of multiple handlers. Thus, in one embodiment, each thread is capable of servicing any work item that might be placed in the completion port queue 422.

The completion port queue 422 is a FIFO queue, in one embodiment, where the only items that are placed in the queue 422 are items that can be performed by a thread. At times, the queue 422 may include many more work items than are available threads. Each work item will remain in the queue until a thread is available to process the work item. In one embodiment, queue 422 may be implemented as multiple priority level queues, as is described in conjunction with queues 432 and 434, below.

When data has been received into one of the I/O ports 424, a completion port thread places a work item in the completion port queue 422, indicating that work is available for a receiver thread 412. In one embodiment, the completion port has its own pool of threads, which may exceed the number of processors. This is to ensure that work is efficiently queued whenever data is received into one of the I/O ports 424.

When a work item exists in the completion port queue 422, the system calls a request manager (not shown), which processes the request header, and schedules an available receiver thread 412 to invoke a request specific handler based on the request type identifier. A thread is considered available if it has been placed in a ready state. This may be a thread that is running on a CPU, but has finished another work item before its quantum expires. In such a case, the thread informs the I/O port that it is available to process a new work item. Alternatively, an available thread may be a new thread that will be scheduled for execution on an available CPU.

If it is necessary to schedule the receiver thread, the request manager determines whether a CPU is available to run the receiver thread 412. This can be done, for example, by scanning an idle processor mask (not shown) in one embodiment. The idle processor mask includes at least one bit for each CPU, and the value in each CPU's bit indicates whether the CPU is busy or idle. A CPU is generally considered busy if it is executing another thread or some other code, or is waiting for some result to be returned. If no CPU is available to run the receiver thread 412, then host computer 402 uses pre-emptive scheduling similar to the scheduling done in prior art systems, waits for a running thread or CPU to become available, or interrupts a lower priority running thread.

The request specific handler is responsible for parsing the request, processing request specific data (e.g., identifiers of a desired record set), and formulating one or more work items that specify tasks to be carried out by a worker thread. If the request is to transfer data from client computer 404 to a database, then the receiver thread 412 begins receiving the input data into one of multiple input queues 442. In one embodiment, input queue 442 is a first-in, first-out (FIFO) data structure that acts as expansion mechanisms for data that is transferred between the receive handler and the work handler. Queue 442 absorbs incoming data until a worker thread becomes available or can be scheduled to process that data. Depending on the nature of the receive and work handlers, queue 442 can be written to or read from synchronously or asynchronously. The nature of queue 442, and the ability of a receiver thread to asynchronously trigger a worker thread means that an entire data set need not arrive at host computer 402 before a worker thread can begin processing the incoming data. Thus, it is not necessary to allocate a block of memory as large as an incoming data set. Instead, the incoming data can be received and processed piecemeal, requiring smaller blocks of memory for caching the incoming data.

In one embodiment, data is added to queue 442 as the data arrives. In another embodiment, data is grouped into chunks of a certain size before being placed in queue 442. In still another embodiment, the data chunks can be of an arbitrary size (with some minimum size requirement). In still another embodiment, the data chunks under a desired size are queued if no data is received within a specific time period (e.g., a timeout).

Queue 442 exists in an address space that is shared by the receiver and worker threads. The input data will continue to fill queue 442 until the cache is full, or until the data is read and transferred by a worker thread. In one embodiment, a separate input queue 442 is allocated to each open client connection.

Once a sufficient amount of data is available in input queue 442 for processing, receiver thread 412 creates and places a work item in a low priority work queue 432. Work queue 432 is capable of storing multiple work items. In one embodiment, the low priority work queue 432 exists in an address space that is shared by the receiver and worker threads. Receiver thread 412 then places a reference in the completion port queue 422, indicating that work is available for a worker thread 414. In one embodiment, the reference does not indicate where the work item is available, just that some work exists for a worker thread to perform. The associated receiver thread is then placed back in a ready state, thus being released to perform another task, if one is available.

When the completion port queue 422 indicates that work is available for a worker thread, the server calls a work manager (not shown), which determines, from the work item, what type of work needs to be performed. The work manager then schedules a worker thread to invoke an appropriate work handler.

Once the worker thread 414 begins running, it looks for the associated work request first in a high priority work queue 434, described below. If no work request is in the high priority work queue 434, then the thread 414 looks to the low priority work queue 432. In alternate embodiments, any number of priority work queues (including a single work queue) could be implemented in the system. For example, in one alternate embodiment, three work queues could be implemented, where the queues are assigned to new work items, work items associated with in-progress functions, and high-priority work items. Even more than three work queues could be implemented in other alternate embodiments. As will be described in more detail below, the multiple work queues enable the system to complete existing work (i.e., work that is beyond an initial state) before beginning the execution of new work, thus decreasing the system's response time, on average.

The worker thread 414 evaluates the task specified in the work item, and makes any operating system calls that are necessary to perform the task. If the task involves storing data in the database, then the worker thread 414 works with a database manager to move the data from the input queue 442 to the appropriate device driver and/or network interface or application interface. In one embodiment, the database manager is a separate entity from the application server, although it could be part of the application server in another embodiment.

If the request is a request to obtain data from the database and send the data to the requesting client computer, then the worker thread 414 sends the request to the database manager, which in turn invokes the appropriate device driver and/or network interface or application interface to bring the data from the database into host computer 402.

Figure 5:
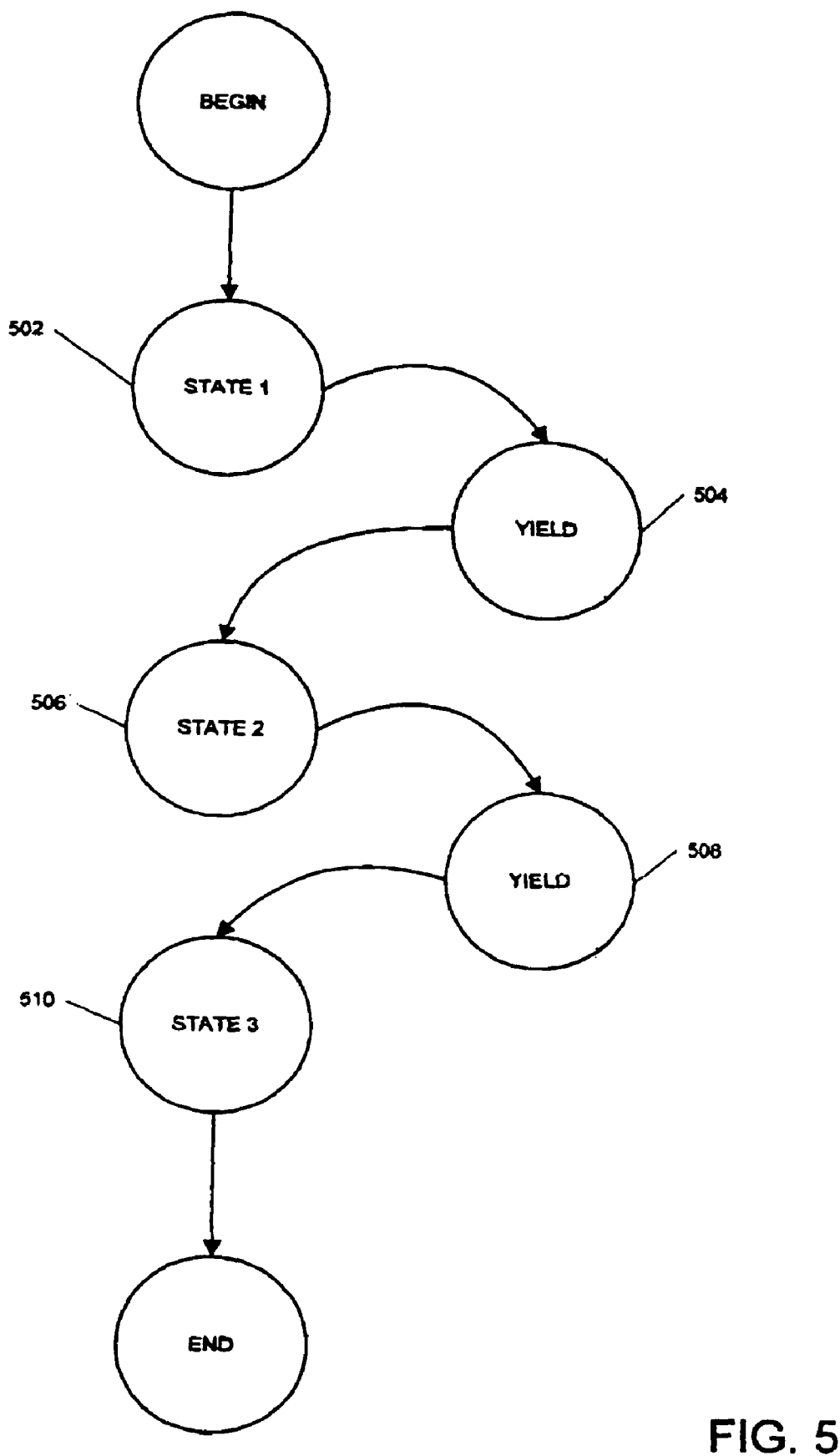
FIG. 5 illustrates a state diagram showing a hypothetical function's execution states in accordance with one embodiment of the present invention.

In one embodiment, each application function can be programmed as a state machine, where a multi-state function is completed by the server as described below. FIG. 5 illustrates a state diagram showing a hypothetical function's execution states in accordance with one embodiment of the present invention. The function includes three operations. These operations are to get a first table from disk, to get a second table from disk; and to join the first table and the second table, which will then be returned to a requester.

Referring to both FIGS. 4 and 5, in accordance with the present invention, each operation could be performed in the context of a separate function state, and three such states 502, 506, 510 would comprise the function. The server would begin processing the function after receiving a request from the client to perform the multi-state function. In one embodiment, the request identifies the desired tables. The appropriate receiver handler would create an appropriate work item, and place that item on the low priority queue 432. A worker thread would then implement the first function state 502 by performing a first task associated with a first state of the multi-state function. Part of the task involves making an asynchronous request for the first table, assuming the table can be read in a single request. The worker thread would then be placed back in the ready state, and the function would yield 504. When the thread is in the ready state, it is free to process other requests or wait until a request is signaled. In another embodiment, the work item is placed in a "pending queue" until the operation completes. When the operation completes, the work item is moved back to the work queue.

After the database manager receives the data specified in the asynchronous request (i.e., the first table), the database manager would place a new work item in the high priority queue 434, indicating that a new worker thread in the ready state should be invoked to perform a task associated with the second function state 506. The worker thread would then implement the second function state 506 by making an asynchronous request for the second table. That worker thread would then be placed back in the ready state, and the function would again yield 508.

As mentioned previously, the use of the low priority queue 432 and the high priority queue 434 enables functions further along in processing to be given priority over functions in their initial state. In alternate embodiments, more or fewer queues could be implemented, or the criteria for determining when you elevate a work item to a higher priority could be different. For example, a priority queue may have an integer key, and the priority could be the state number. This would result in a preference being given to work items that have been in the queue longer.

After the database manager receives the second table, the database manager places a final work item in the high priority queue 434, indicating that a new worker thread in the ready state should be invoked to perform a task associated with the third and final function state 510. In this case, the thread implements the third function state 510 by performing an operation on the received data. This operation involves joining the two received tables, and causing the result to be returned to the client. That worker thread would then be placed back in the ready state, and the function would end.

In order to most efficiently manage CPU resources, application designers should write each state so that it is as short as possible. For example, a particular function may initiate some long-running process, such as searching for a string in a large file. A well-designed implementation would break the process into shorter states, so that the function would occasionally yield, in a manner such as the one described above, and allow other threads to execute.

In addition, an application designer should cause a function state transition to occur each time the function encounters a potentially blocking request. When functions are programmed properly, the system of the present invention will guard against predictable blocking conditions. For example, if a function will predictably read or write to disk, access a database, or read or write on the network, the application designer should write the function as a state machine, where a state transition occurs after the blocking condition is encountered.

Unfortunately, not all blocking conditions can be anticipated. For example, an application designer cannot know that a page fault will occur due to a particular request. Unanticipated blocking conditions are efficiently handled by the system of the present invention, however, because the system maintains at least one extra thread in the ready state. Thus, an extra thread is available for execution when a CPU encounters a blocking condition for which no state transition is performed.

This process is now explained in the context of FIG. 4. While implementing an efficiently designed function, if a worker thread 414 encounters a potentially blocking request (e.g., a request for data from disk), then the worker thread issues an asynchronous request to the database manager (not shown). The worker thread 414 then is placed back in the ready state, making it available to perform other work. The thread informs the I/O port 424 that it is ready for more work and, if more work is available, the thread immediately starts processing it. In one embodiment, where threads are executed in quantums, a single thread may potentially perform multiple requests before its quantum in the system expires. Thus, the CPU is more fully utilized than in prior art systems, which would perform a context switch and switch to another thread if the running thread completed a request before its quantum expired.

In one embodiment, after the database manager receives the requested results, it issues a "callback" on the associated work item, and places a work item in the high priority work queue 434. In another embodiment, after receiving the asynchronous request, the database manager places the request in a pending queue (not shown). When the database manager receives the requested results, it takes the request off the pending queue, and places a work item in the high priority work queue 434, in one embodiment. In other embodiments, the database manager would place the work item in whichever queue was appropriate for advancement to a subsequent state. The database manager also indicates that work is available in the completion port queue 422. Subsequently, when a new worker thread picks up the work item from the high priority work queue 434, the function is advanced to the next state.

If the database is a synchronous database, then in one embodiment, the database manager also can implement a number of database threads (not shown) that synchronously take work items off the pending queue and hand them off to the database engine. Although the database threads run synchronously, the pending queue enables the boundary between the server and the database manager to remain asynchronous. Thus, the application logic in the worker threads can be written independently of whether the database is an asynchronous or synchronous database.

As indicated above, each worker thread 414 first looks for work on the high priority work queue 434 and, if none is available there, it looks to the low priority work queue 432. By implementing multiple priority levels, functions further along in processing will be worked on first, thus facilitating completion of those functions and freeing up of server resources. In other embodiments more than two priority level queues could be used. Basically, any number of priority level queues could be used, where work items relating to function states that are further along in processing would be placed in the higher priority queues as subsequent function states are executed. The subsequent function states, thus, would be picked up by the server faster: The available worker threads would look for a work item first in the queue corresponding to the highest priority level, then would look in work queues corresponding to sequentially lower and lower priority levels, until a work item is found. In another alternate embodiment, a single work queue could be used, rather than implementing multiple priority level queues.

Eventually, results of the request will become available. For example, the results of an operation performed by a worker thread or a complex logic thread may become available. Alternatively, results may become available to the database manager. At that time, the thread that generated the results or the database manager places a work item in the high priority work queue 434, and a reference in the completion port queue 422. A worker thread then stores those results in a results queue 444. Similar to the input queue 442, the results queue 444 acts as an expansion mechanism between the worker and reply threads for the results of a data request.

Queue 444 absorbs results until a reply thread can be scheduled to return the results. Depending on the nature of the reply and work handlers, queue 444 can be written to or read from synchronously or asynchronously. The nature of queue 444, and the ability of a worker thread to asynchronously trigger a reply thread means that an entire result set need not arrive at host computer 402 before a reply thread can begin returning the results to the requester. Thus, it is not necessary for the memory manager to allocate a block of memory as large as an entire result set. Instead, the results can be received and returned piecemeal, requiring smaller blocks of memory for caching the results. Queue 444 exists in an address space that is shared by the reply and worker threads. The results will continue to fill queue 444 until the cache is full, or until the data is read and transferred by a reply thread. In one embodiment, a separate results queue 444 is allocated to each open client connection.

Results can be received from the database manager, or they can be generated by a worker thread or a complex logic thread. Either way, when the worker thread 414 has placed a sufficient amount of results in the results queue 444, the worker thread 414 places a work item in a reply work queue 436, and places a reference in the completion port queue 422, indicating that work is available for a reply thread 416. When the completion port queue 422 indicates that work is available for a reply thread, the server calls a reply manager (not shown), which determines, from the task specified in the work item, what type of work needs to be performed. The reply manager then schedules a reply thread to invoke an appropriate reply handler.

A reply handler takes the result off the results queue 444, and may immediately send at least a portion of the result to the client. Alternatively, the reply handler may store the result on host computer 402. The reply handler sends the received data to the client via one of the completion port's I/O ports 424. However, when the server receives a result set, it may only represent a portion of the entire result. In one embodiment, the server maintains one or more partial results caches 450, within which the server can store entire result sets that are sufficiently small. The use of the partial results cache 450 is described in more detail in conjunction with FIGS. 13 and 14.

The above description of FIG. 4 illustrates that, once an initial request is queued, the receiver 412, worker 414, and reply 416 threads can operate in parallel placing data on and taking data off the input queue 442 and the results queue 444. As described above, after an initial request is queued, and the receiver thread queues a work item for a worker thread, the receiver thread may continue to receive more data while the worker thread operates on the first set of data. Similarly, after the worker thread queues a work item for the reply thread, the worker and receiver threads may continue to receive and operate on subsequent sets of data. In this manner, during steady state processing of a particular request, the receiver, worker, and reply threads all could be operating simultaneously. This enables portions of the results of a particular request to be returned to the requester at the same time that data relevant to the request is being received.

Depending on the application, the server may receive a request to perform some type of business logic (e.g., a credit check on a particular customer). In order to increase system throughput, in one embodiment, an application designer can cause complex business logic to be performed by lower-priority complex logic threads, rather than by worker threads 414. Although the term "complex logic" is used herein, it is meant to include both computationally intense logic and also logic that takes a long time to execute, and that cannot easily be broken into small states.

Figure 6:
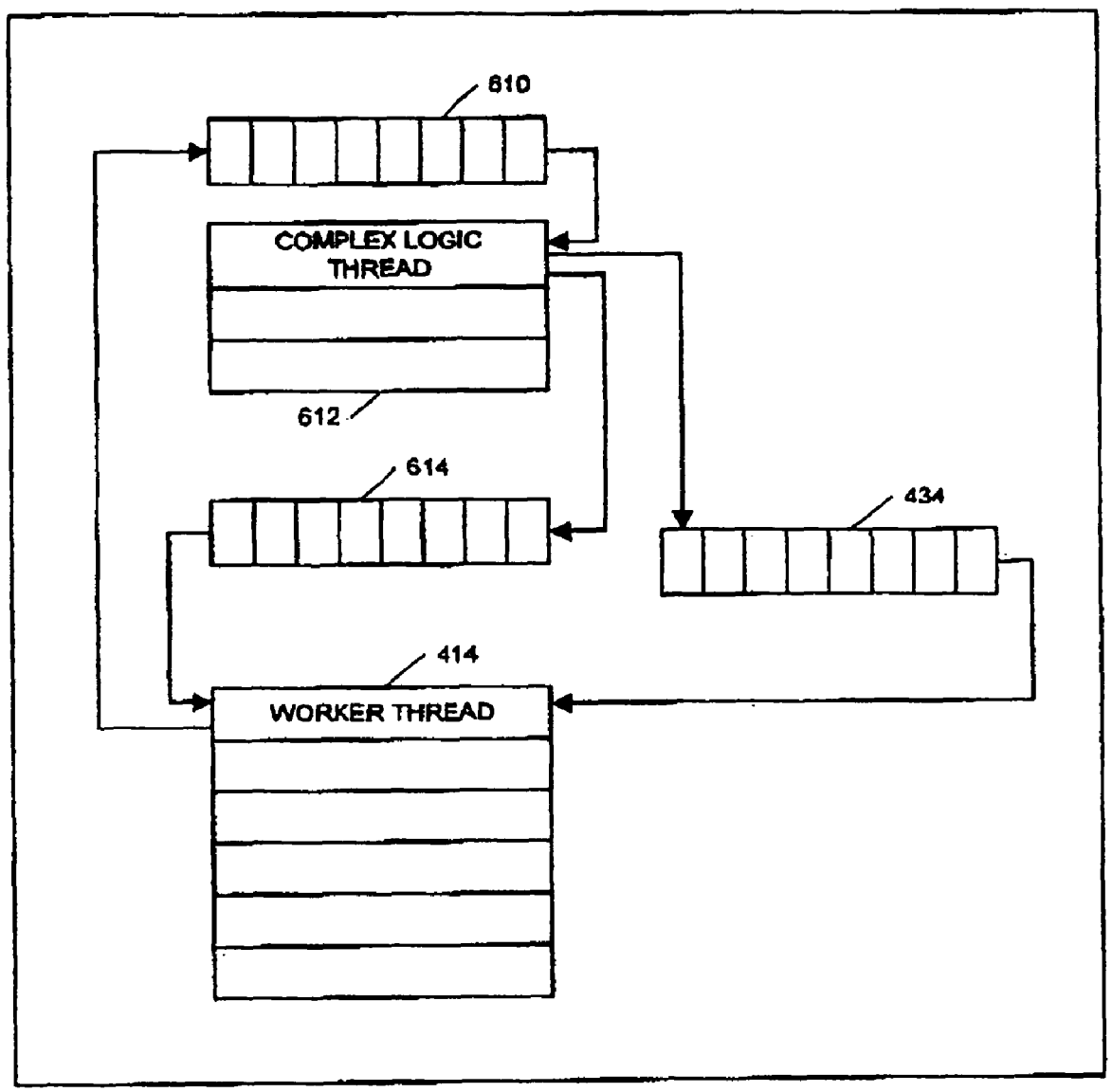
FIG. 6 illustrates a simplified block diagram of a server deploying business services that include complex or long-running logic in accordance with one embodiment of the present invention.

FIG. 6 illustrates a simplified block diagram illustrating the interaction of worker threads and complex logic threads in accordance with one embodiment of the present invention. When the server receives a request to perform some type of business logic, the request is initially picked up by a worker thread 414, in one embodiment. The corresponding request-specific work handler can be written such that it then passes the request off to be performed by a lower-priority complex logic thread 612.

In one embodiment, this is done by the worker thread 414 creating and placing a work item in a complex logic work queue 610, and then placing a reference in the completion port queue 422 (FIG. 4), indicating that work is available for a thread within a pool of available complex logic threads 612. In another embodiment, the complex logic threads could be implemented similar to a traditional thread pool, where a completion port is not used, and work is queued and processed similar to prior art methods. In still another embodiment, the receiver queues the work item directly to the complex logic queue 610.

In one embodiment, the pool of complex logic threads 612 is separate from the pool of generic threads 410 (FIG. 4). In another embodiment, the complex logic handlers can be invoked by the generic thread, and thus the complex logic threads would be part of the pool of generic threads 410.

When the reference has been placed in the completion port queue 422 (FIG. 4), a complex logic thread manager (not shown) is then called to schedule a complex logic thread 612 to perform the work. As indicated previously, the complex logic threads 612 have a lower priority than the worker threads. Even so, the complex logic threads 612 are granted some minimum system resource (i.e., CPU time), even though they may be preempted by higher priority worker threads that implement data services. When a complex logic thread 612 has been preempted, the work it was performing can be placed back on the complex logic work queue 610, or in the completion port queue.

In one embodiment, complex logic can be performed using multi-state functions, as described previously. In such an embodiment, a long-running function could be broken up into separate states, each of which is executed by an available complex logic thread. In another embodiment, the complex logic thread can be executed preemptively, similar to prior art systems.

Once the complex logic thread completes its execution, it creates and places a work item on the high priority work queue 434, and places a reference in the completion port queue. This indicates that a worker thread should be scheduled to do something with the results of the complex logic operation. Similar to the input queue 442 (FIG. 4) and the results queue 444 (FIG. 4), a complex logic results queue 614 exists between the complex logic threads 612 and the worker threads 414. The complex logic thread 612 places the results of the complex logic operation into that queue 614 for the worker thread 414 to access.

As indicated in FIG. 4, receiver threads 412, worker threads 414, and reply threads 416 can be executed in parallel on different CPUs. In addition, complex logic threads 612 (FIG. 6) also can be executed in parallel with threads 412, 414, and 416. Thus, host computer 402 can simultaneously receive requests and data, process the work specified in the requests, return results to the client computer, and perform complex business logic, if any.

Figure 7:
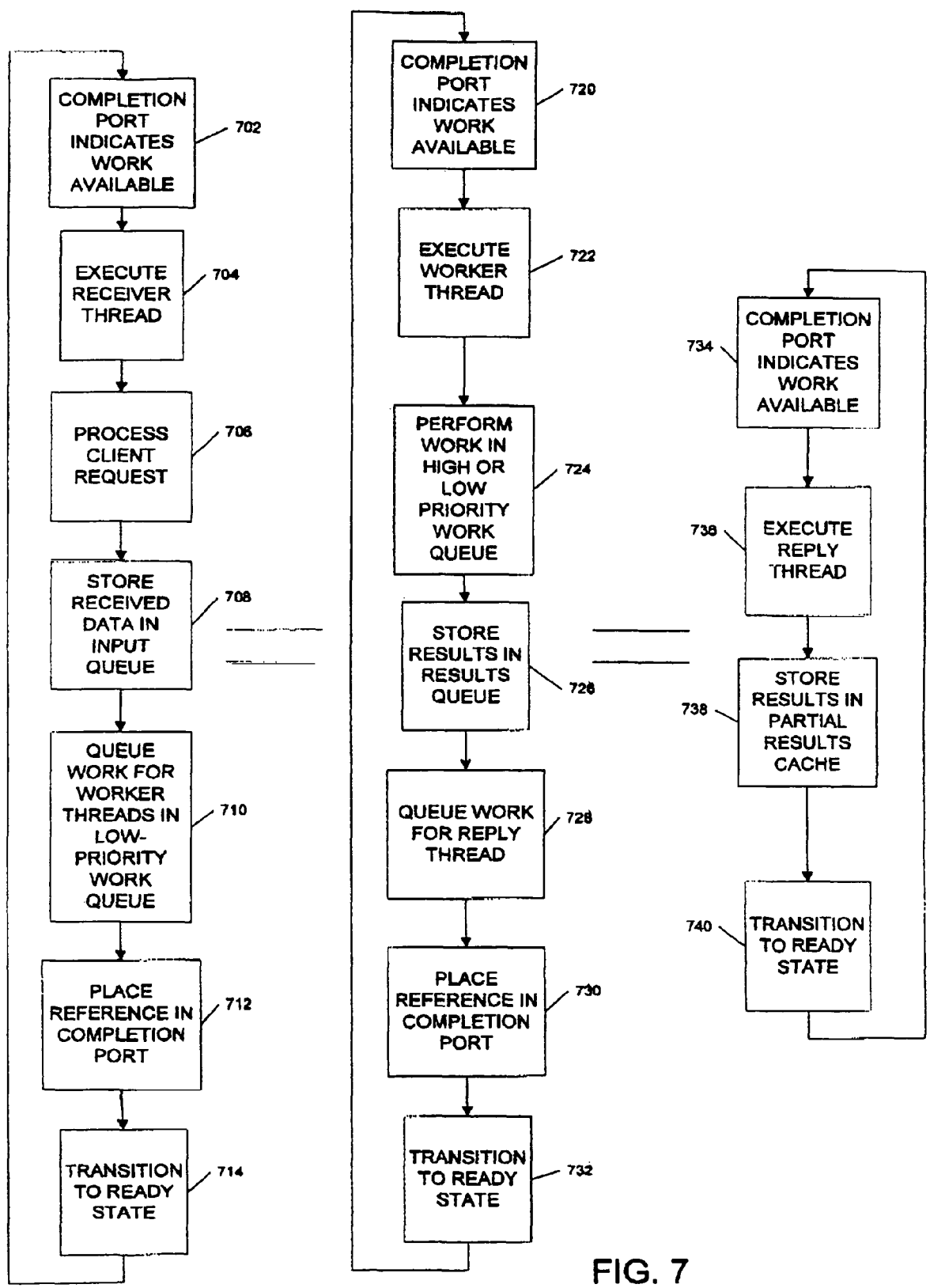
FIG. 7 illustrates a flowchart of the parallel processes of receiving incoming requests, performing requested work, and returning results in accordance with one embodiment of the present invention.

FIG. 7 illustrates a flowchart of the parallel processes of receiving incoming requests, performing requested work, and returning results in accordance with one embodiment of the present invention. Although executing complex business logic also could be performed in parallel, it is not shown in FIG. 7 for ease of illustration.

In one embodiment, the process of receiving incoming requests is accomplished by blocks 702-714, performing requested work is accomplished by blocks 720-732, and returning results is accomplished by blocks 734-740. Each process illustrates the flow of execution for a single receiver thread, worker thread, and reply thread, respectively. The server could be executing multiple receiver, worker, and reply threads simultaneously, however.

In one embodiment, while the receiver threads (i.e., blocks 702-714) are receiving incoming requests and posting work items to a work queue (e.g., queue 432, FIG. 4), the worker threads (i.e., blocks 720-732) can simultaneously be performing work specified in previous work requests. In addition, the reply threads (i.e., blocks 734-740) can simultaneously be receiving and returning results to the requester. Theoretically, if a particular data transfer request is large enough, one or more receiver, worker, and reply threads could simultaneously be processing the same request.

When the completion port queue indicates that a work item exists for a receiver thread, in block 702, a receiver thread (e.g., thread 412, FIG. 4) from the pool of receiver threads picks up the work item and begins executing it. The receiver thread that executes the work item is a thread that is in the ready state, meaning that the thread is not currently performing other work, and is available to run. This may be a thread that is running on a CPU, has completed another request before its quantum expired, and has indicated that it is available to execute another request. Alternatively, it may be a thread that is not currently running on a CPU. In the latter case, the thread would be scheduled to run on an available CPU, if any. When a thread and/or CPU is available, a thread in the ready state is executed, in block 704. If no thread or CPU is available, then pre-emptive scheduling similar to prior art systems can be employed, in one embodiment.

Beginning the execution of a new thread essentially involves performing a context switch. When the new thread is selected to run, the volatile machine state of any thread that might be currently running on the CPU is saved, the volatile machine state of the new thread is loaded, and the new thread's execution is started. In addition, on some hardware architectures, key caches are invalidated and/or others may have less locality when the next thread executes.

A request could be, for example, a request to access data stored in a database, a request to store data in a database, a request to perform some logical function, or a combination of these types of requests. Each receiver thread is capable of initially processing each type of request that is anticipated by the application developer. In block 706, the request is processed by parsing the request and determining its type. This enables the receiver thread to create an appropriate work item that specifies a task for a worker thread to perform. In addition, if the request type is to transfer data from the client to the database, the receiver thread begins storing the received data in the input queue (e.g., queue 442, FIG. 4) in block 708. If no data is to be transferred from the client to the database, then block 708 is not performed.

Once a sufficient amount of data is available in the input queue for processing, or if the processing requires no data, then the receiver thread queues work for the worker threads by placing a work item in the low priority work queue (e.g., queue 432, FIG. 4), in block 710. The receiver thread then places a reference in the completion port queue (e.g., queue 422, FIG. 4), in block 712. As described previously, the receiver threads will then continue to fill the input queues asynchronously in parallel with the worker threads processing the input data.

After completing this request processing, the receiver thread enters a ready state. Essentially, the receiver thread is placed back in the ready state, and is available to process another incoming request. Alternatively, the receiver thread could be deleted.

Worker thread execution is illustrated by blocks 720-732. Once the completion port queue indicates, in block 720, that work is available, a worker thread (e.g., thread 414, FIG. 4) from the pool of worker threads is scheduled to run. The worker thread that is scheduled to run is a thread that is in the ready state, meaning that the thread is not currently performing other work, and is available to run (i.e., is in the ready state). When a CPU is available or if the pre-emptive scheduler schedules the next thread to run, then the next thread in the ready state is executed, in block 722.

As was explained above, the newly executing worker thread looks for the available work first in the high priority work queue (e.g., queue 434, FIG. 4). If no work is available there, the thread looks in the low priority work queue (e.g., queue 432, FIG. 4). In alternate embodiments, where more than two priority level queues are implemented, the worker thread would look in the highest priority work queue first, and work its way down the queues, in decreasing priority order, until a work item is found. In another alternate embodiment, where only a single work queue is implemented, the worker thread would look only in the one work queue for work.

When a queue has multiple work items, the worker thread takes the item that has been in the queue the longest, in one embodiment. In other embodiments, the worker thread could take the newest item, or it could take items having the highest priority level, if a priority level is indicated.

The worker thread picks up the work item from the high or low priority work queue in block 724, and performs the task specified in the work item. Each worker thread is capable of performing each type of data service task that is anticipated by the application developer. For example, a work item could indicate that data in the input queue is to be stored in the database. In such a case, the worker thread would perform the requested data transfer, making calls to the database manager and operating system as necessary. Alternatively, a work item could specify that data is to be retrieved from the database and sent to the client. The worker thread would make the operating system calls necessary for the host computer to retrieve the requested data.

As described previously, this may involve the worker thread issuing an asynchronous request and being placed back in the ready state, where the next function state is picked up by a subsequently executed worker thread. As will be explained in more detail below, the received data results would then be processed by a reply thread.

In one embodiment, as explained previously, worker threads queue business logic to be performed by complex logic threads (e.g., thread 612, FIG. 6). In an alternate embodiment, however, worker threads could also perform business logic functions, if necessary.

Once the worker thread has completed the task specified in the work item, the worker thread finishes storing the results (if any) in a results queue (e.g., queue 444, FIG. 4) in block 726. The worker thread then creates and queues a work item for a reply thread in a reply work queue (e.g., queue 436, FIG. 4), in block 728. The worker thread places a reference in the completion port queue, in block 730, and then transitions to a ready state, in block 732. As with the receiver threads, this involves placing the worker thread back in the ready state, thus freeing it to perform a subsequent task.

Reply thread execution is illustrated by blocks 734-740. When the completion port queue indicates that a work item exists for a reply thread, in block 734, a reply thread (e.g., thread 416, FIG. 4) is scheduled to run. The reply thread that is scheduled to run is a thread that is in the ready state, meaning that the thread is not currently performing other work, and is available to run (i.e., is in the ready state). When a thread or CPU is available or when the pre-emptive scheduler schedules the next thread to run, then the next thread in the ready state is executed, in block 736.

Results may be in the form of data or an indication that an operation (e.g., a data storage operation) was successful, for example. When the results include data, the reply thread sends some or all of the data to the client. The reply thread also determines the size of the entire result, and if it is sufficiently small, stores the entire result in a partial results cache (e.g., cache 450, FIG. 4), in block 738. If the data was received from a database, then the server then closes the database connection. If the results are not sufficiently small, the server keeps the database connection open.

Each reply thread is capable of receiving results from the results queue (e.g., queue 444, FIG. 4) and returning the results to the requester (e.g., a client computer), as anticipated by the application developer. Once the reply thread has finished receiving and returning the results, the thread transitions to a ready state, in block 740. As with the receiver and worker threads, this involves placing the reply thread back in the ready state, thus freeing it to perform a subsequent task.

FIG. 7 illustrates the parallel execution of the receiver, worker, and reply threads, in one embodiment. Execution of each of these threads is described separately in more detail in conjunction with FIGS. 8-13.

Figure 8:
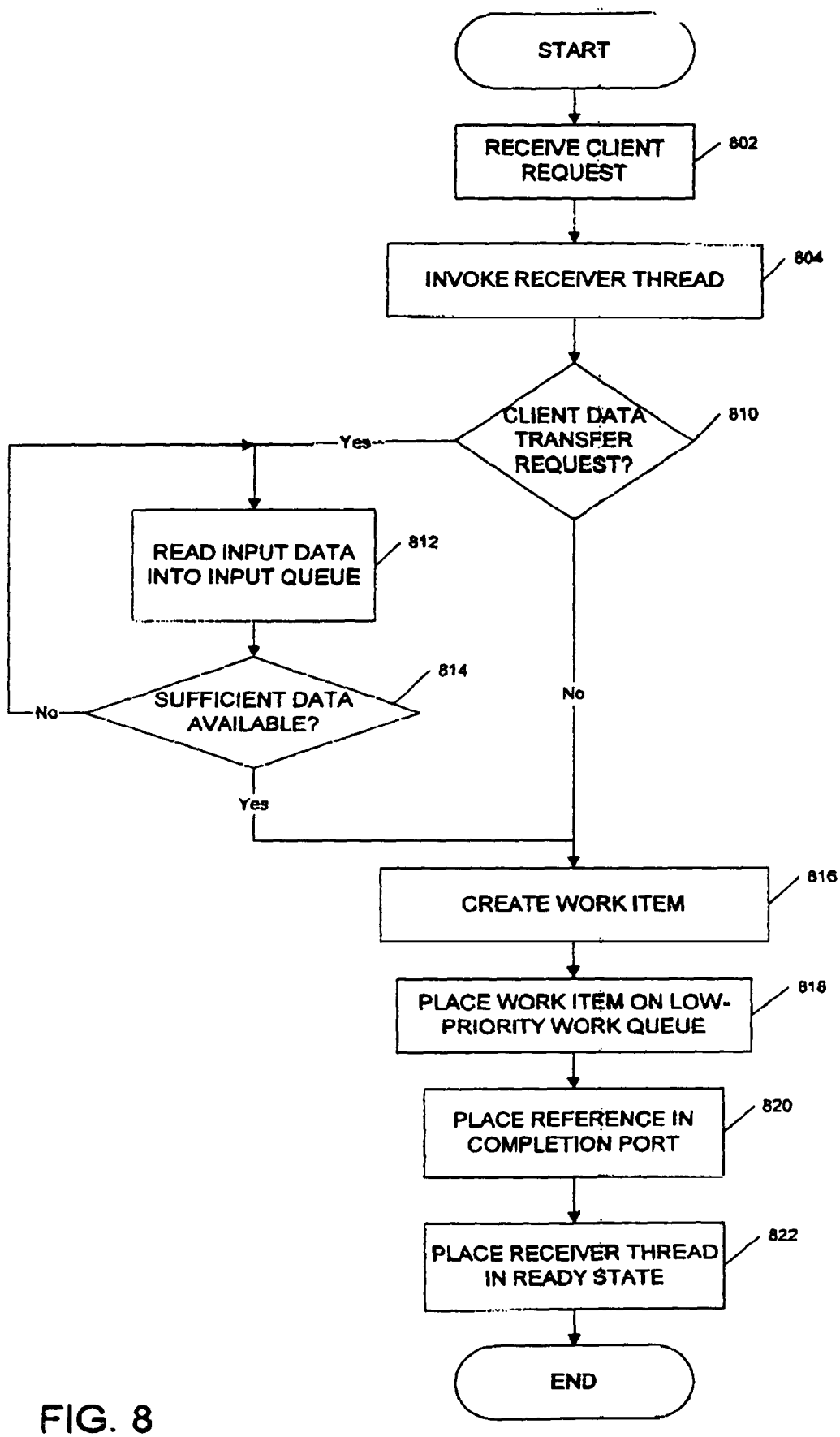
FIG. 8 illustrates a flowchart of a method for receiving incoming requests by a receiver thread, and queuing work to worker threads in accordance with one embodiment of the present invention.

FIG. 8 illustrates a flowchart of a method for receiving incoming requests by a receiver thread (e.g., thread 412, FIG. 4), and queuing work to worker threads in accordance with one embodiment of the present invention. The method begins, in block 802, when the completion port queue (e.g., queue 422, FIG. 4) indicates that a work item exists for a receiver thread.

The host computer then invokes a currently running and available thread or schedules and loads an available receiver thread to execute on an available CPU, in block 804. If no thread or CPU is available, the server can implement pre-emptive scheduling to determine whether a thread whose quantum has expired or a lower priority thread (e.g., thread 426) is currently running. If so, the server can preempt the running thread by performing a context switch, and loading the next waiting thread on that CPU. Even if the server will preempt a lower priority thread, the server will wait until its quantum expires, in one embodiment.

Once executing, a determination is made, in block 810, whether the request is to manipulate client data and/or transfer data from the client to a database. If so, then a number of bytes of the data is read from the network (or other device) using I/O ports. The operating system then signals that input client data is available, and that number of bytes is read into an input queue (e.g., queue 442, FIG. 4), in block 812. A receiver thread determines, in block 814, whether sufficient input data is available for a worker thread to work upon. If not, then the receiver thread is placed back in the ready state until additional data is available in the input queue. This process continues until sufficient data is available or some timeout occurs.

When sufficient data is available, or if the request is not a request to manipulate client data and/or transfer data from the client to a database (implying that the request is to manipulate database data and/or transfer data from the database to the client), then the receiver thread creates a work item that indicates the desired operation, in block 816. In block 818, the receiver thread places the work item on a low priority work queue (e.g., queue 432, FIG. 4). The receiver thread then places a reference in the completion port queue (e.g., port 422, FIG. 4), in block 820.

The receiver thread is then placed back in the ready state, in block 822, and the method ends. Alternatively, the thread can be deleted from the server. Because the receiver thread placed a reference in the completion port queue, a worker thread will then be executed to perform the corresponding task specified in the work item.

Figure 9:
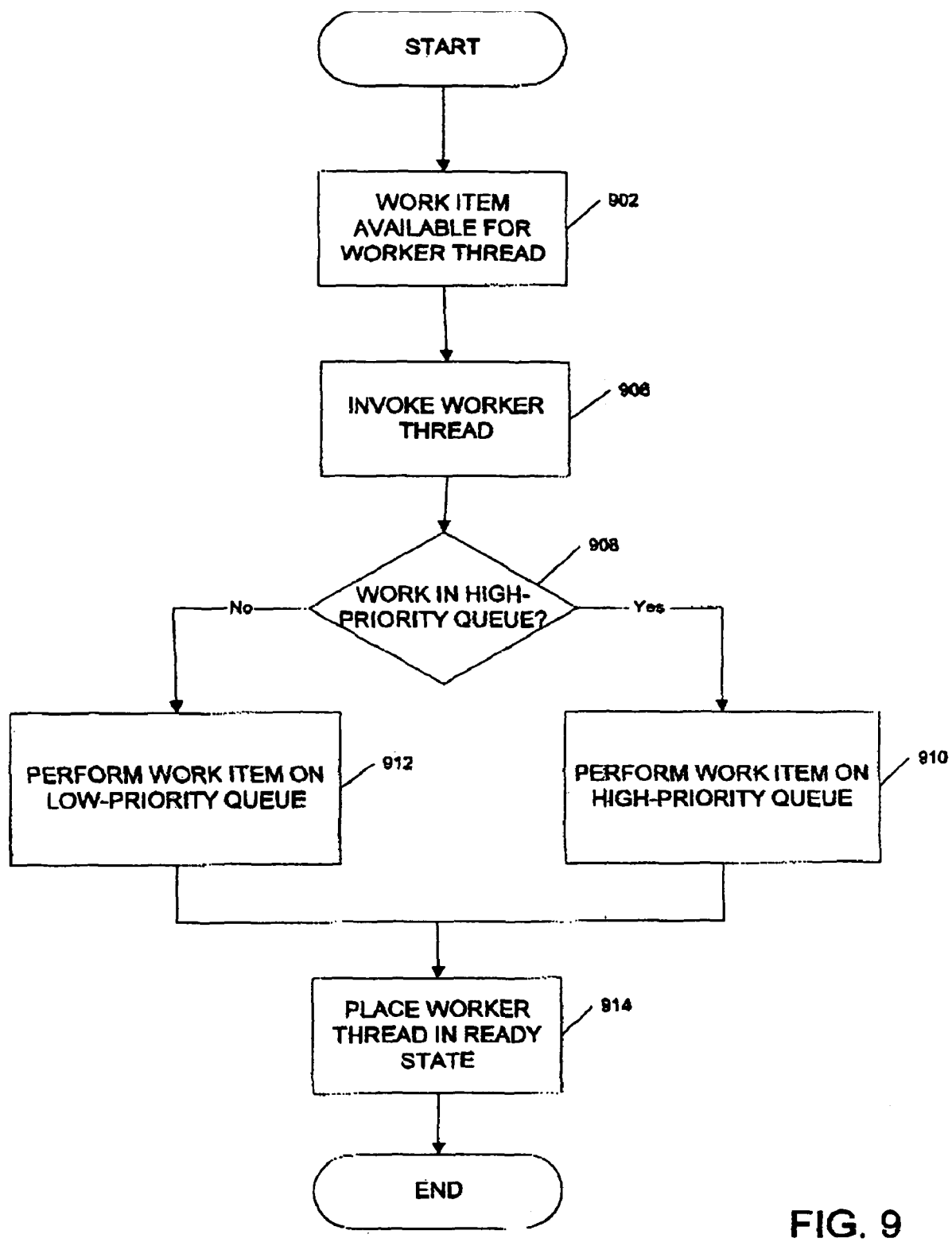
FIG. 9 illustrates a flowchart of a method for processing work by a worker thread in accordance with one embodiment of the present invention.

FIG. 9 illustrates a flowchart of a method for processing work by a worker thread (e.g., thread 434, FIG. 4) in accordance with one embodiment of the present invention. The method begins, in block 902, when the completion port queue (e.g., queue 422, FIG. 4) indicates that a work item exists for a worker thread.

If a currently running thread is not available on a CPU, the server then schedules a worker thread for execution, in block 906. In such a case, when a CPU becomes available, the server loads the worker thread onto the CPU, and the worker thread begins executing. If no thread or CPU is available, the server can determine whether a running thread's quantum has expired, or whether a lower priority thread (e.g., thread 612, FIG. 6) is currently running. If so, the server can preempt the running thread by performing a context switch, and loading the next waiting thread on that CPU.

In block 908, the worker thread determines whether a work item is in the high priority work queue (e.g., queue 434, FIG. 4). As described previously, high priority work items typically correspond to functions further along in processing (e.g., a function that was waiting on some data). If a work item exists in the high priority work queue, then the worker thread performs the task specified in the work item, in block 910. If no work item exists in the high priority work queue, then a work item should exist in the low priority work queue (e.g., queue 432, FIG. 4), and the worker thread performs the task specified in that work item, in block 912.

In the process of performing the task, the worker thread may discover that the task involves computationally intense business logic. If so, the worker thread queues that task to be performed by a complex logic thread (e.g., thread 612, FIG. 6), and places a reference in the completion port queue (e.g., queue 422, FIG. 4).

After performing the task specified in the work item, the worker thread is then placed back in the ready state, in block 914, and the method ends. Alternatively, the thread can be deleted from the server.

As explained previously, each worker thread is implemented as a state machine in one embodiment, where a potentially blocking request within a function will cause the worker thread to issue an asynchronous request to the database manager, and be placed back in the ready state. The function will then be resumed later after the data upon which it was waiting is received by the host computer.

Figure 10:
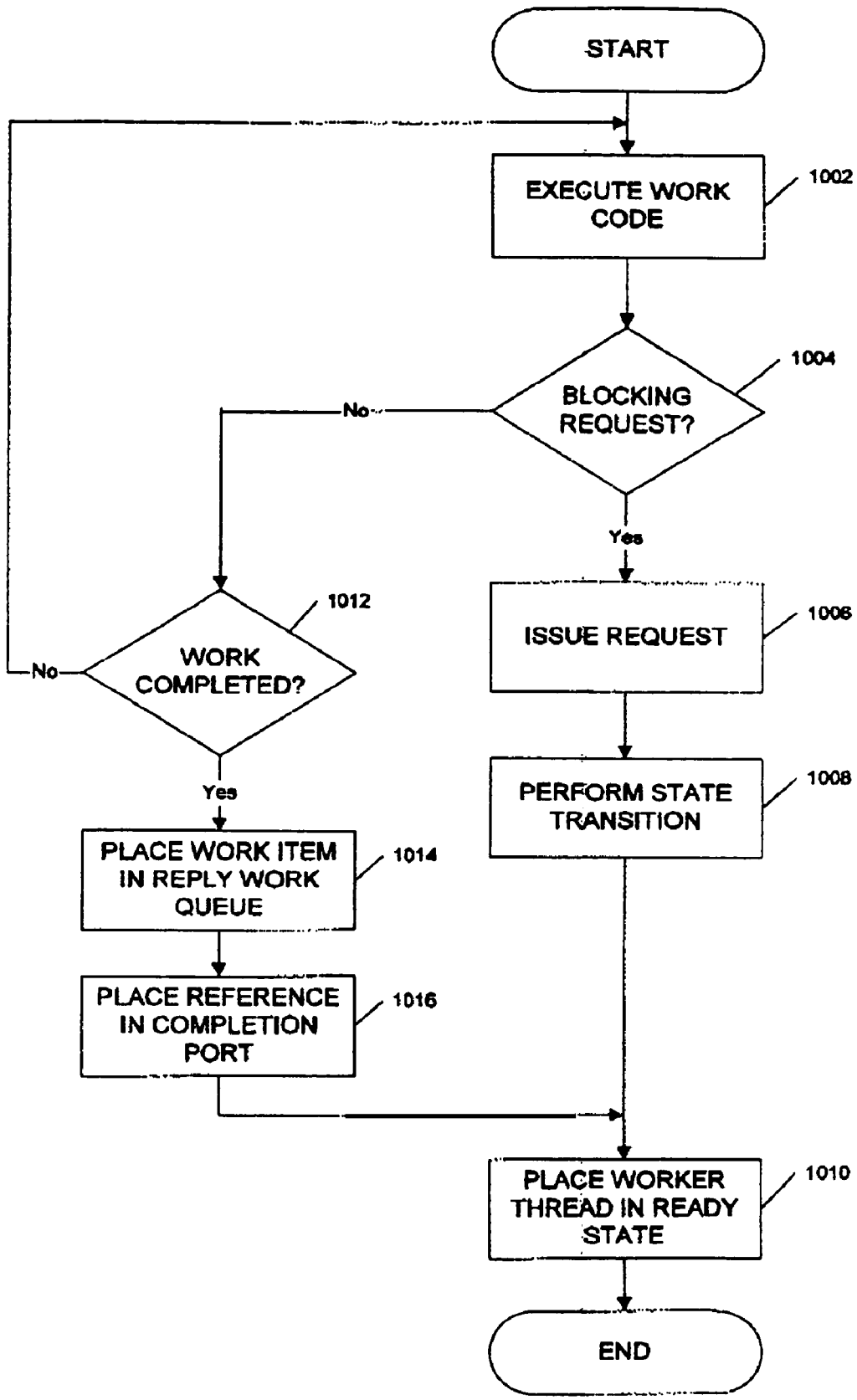
FIG. 10 illustrates a flowchart of a method for implementing a worker thread as a state machine in accordance with one embodiment of the present invention.

FIG. 10 illustrates a flowchart of a method for implementing a worker thread as a state machine in accordance with one embodiment of the present invention. Essentially, the method is a more detailed representation of how a worker thread performs work in blocks 910 and 912 of FIG. 9.

Each worker thread begins processing the task specified in the work item by invoking the appropriate application code (i.e., the appropriate work handler), in block 1002, that corresponds to the request. Executing the code may involve invoking stored procedures and/or making documented calls to the operating system to perform the work. For example, the thread could ask the operating system to retrieve and manipulate data from a database or to store data in the database. The thread could also ask the system to store or retrieve data in local memory (e.g., system memory 322, FIG. 3), in physical memory (e.g., hard disk 327, magnetic disk 329, or optical disk 331, FIG. 3), or on a remote computer (e.g., computers 349, 360, FIG. 3).

After making calls to the operating system or application APIS, the operating system would then interact with the appropriate device drivers, ports, or network interfaces in order to transfer the relevant data. In another embodiment, the worker thread code could make undocumented system calls, and/or could interact with the various device drivers, ports, or network interfaces directly.

After the worker thread begins executing the parsed request, a determination is made, in block 1004, whether a potentially blocking request has been encountered. As described previously, a potentially blocking request could be a request (e.g., a request for data from a disk or a remote computer) that would cause a blocking condition, for example.

If a potentially blocking request has been encountered, then the worker thread issues the request asynchronously, in block 1006. In an alternate embodiment, the request could be issued synchronously. In one embodiment, the worker thread sends the request to the database manager.

As explained previously, part of the request indicates that, after return of the associated data, a new work item should be placed on the high priority work queue (e.g., queue 434, FIG. 4), so that processing of the function can continue. After issuing the request, the worker thread performs a state transition, in block 1008. The thread is then placed back in the ready state, in block 1010, and the method ends.

If, in block 1004, a blocking request has not been encountered a determination is made whether the task specified in the work item has been completed, in block 1012. A task is considered completed when it has transferred some results into the results queue (e.g., queue 444, FIG. 4), or it has issued an asynchronous request for data in response to a potentially blocking condition.

If the work has not been completed, the procedure iterates as shown in FIG. 10. If the work has been completed, and some results are available for processing, then the worker thread queues a work item in the reply work queue (e.g., queue 436, FIG. 4), in block 1014, and posts a reference in the completion port queue in block 1016. The thread is then placed back in the ready state, in block 1010, and the method ends.

FIG. 10 illustrates the point that the worker threads of the present invention, if properly designed, will not block. Therefore, these threads will not enter long wait states due to predictable blocking operations.

Figure 1:
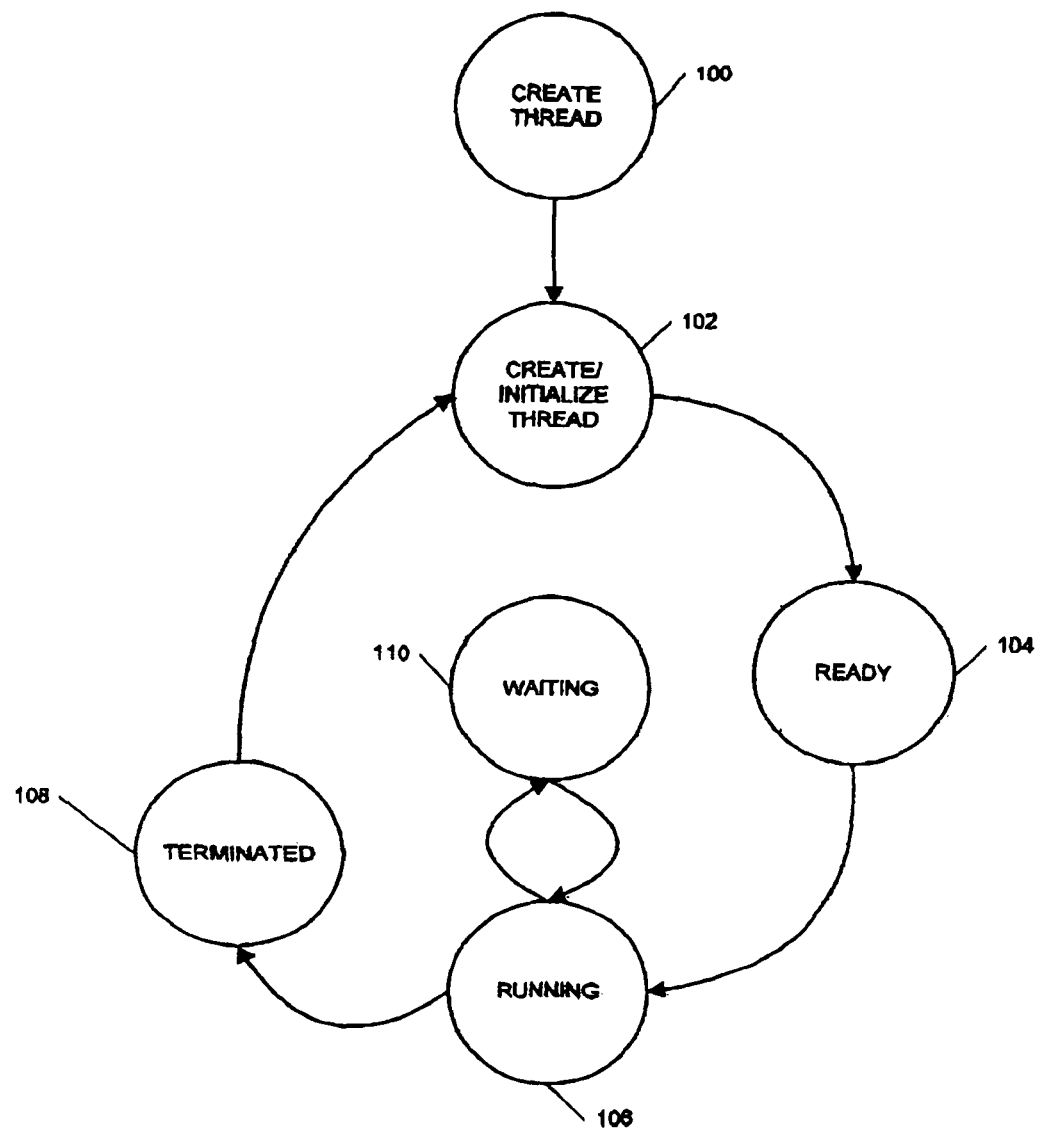
FIG. 1 illustrates a state diagram showing thread execution states in accordance with the prior art.
Figure 2:
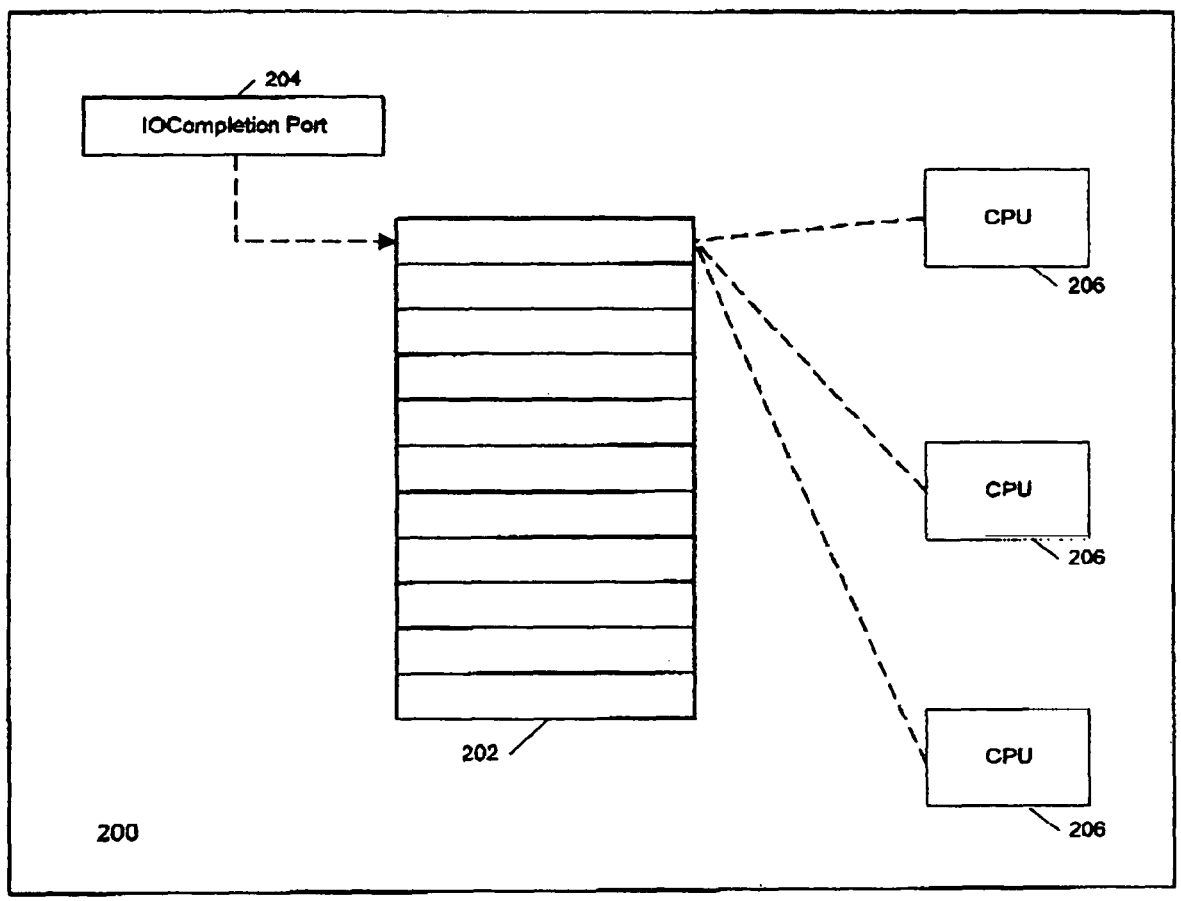
FIG. 2 illustrates a simplified block diagram of a server that uses a pool of worker threads to service client requests in accordance with the prior art.
Figure 11:
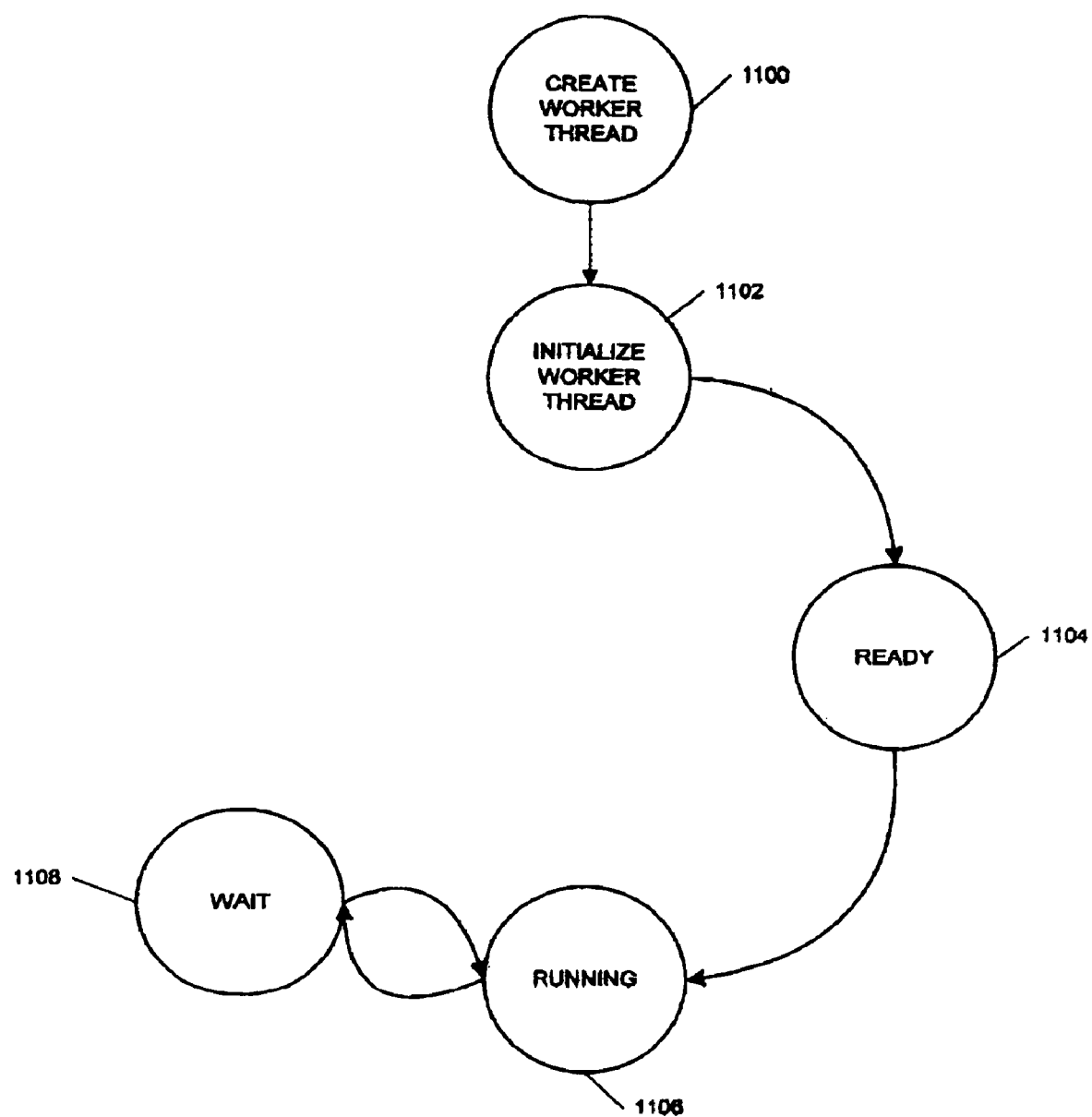
FIG. 11 illustrates a state diagram showing thread execution states in accordance with one embodiment of the present invention.

This is emphasized in FIG. 11, which illustrates a state diagram showing thread execution states in accordance with one embodiment of the present invention. Each worker thread may be in one of several states of execution. These states are similar to the thread execution states illustrated in FIG. 1, except that the threads programmed in accordance with the present invention will not enter a waiting state due to a predictable blocking operation. In addition, the threads are not terminated each time they complete a client request. Instead, the threads are placed back in the ready state, thus eliminating the need to recreate or reinitialize a thread each time one is needed to satisfy a request. In addition, using the I/O ports to signal that a thread has completed a work item, that thread can execute one or more additional work items before its quantum expires. In other words, the rest of the thread's quantum is not wasted.

Referring to FIG. 11, worker threads are first created 1100 and initialized 1102 by the server. As described previously, in one embodiment, the number of generic threads existing in the server at any one time is in a range of about N+1 to about 2*N threads, where N is the number of CPUs. Depending on server activity and other factors, threads could occasionally be created and deleted by the server, as long as the number of threads stays within this range. In alternate embodiments, more or fewer threads could exist. In general, the fewer the number of threads per CPU, the better, as a smaller number of threads limits the number of context switches that must be performed. A larger number of threads may result in wasted CPU cycles, and may adversely affect CPU caches.

After a thread is created and initialized, the thread is placed in a ready state 1104. In one embodiment, this is done by placing the thread in a ready queue. When the completion port queue (e.g., queue 422, FIG. 4) indicates that work is available, the next thread in the ready state is invoked to processes the corresponding work item in the high or low priority work queues (e.g., queues 432, 434, FIG. 4). That thread is then scheduled to run, and eventually enters the running state 1106. If more threads are active on the system than are available CPUs, then pre-emptive scheduling is performed, in one embodiment. Thus, during a particular thread's operation, it may be interrupted at the expiration of each quantum, and temporarily placed in a wait state 108 while another thread is granted some CPU time.

As explained previously, prior art worker threads run each user request to completion. This means that a worker thread may encounter a blocking condition (e.g., a request for data from disk), causing the thread to enter a waiting state (110, FIG. 1). The CPU upon which the thread was executing is then reassigned to perform another waiting thread, and the worker thread will not be resumed until after the blocking condition is alleviated.

In one embodiment of the present invention, when a potentially blocking request is encountered, the worker thread completes its execution by sending out the corresponding request asynchronously. The thread is then placed back in the ready state, re-entering the ready state 1104. By placing the thread back in the ready state after completing the client request, the system of the present invention achieves a key advantage over prior art systems, which terminate threads upon completion of a client request. Specifically, the threads of the present invention do not automatically "die" upon completion of a client request. Instead, they are promptly placed back in the ready state when they complete the request, making themselves available to service another request. Thus, more processor cycles can be devoted to servicing requests, using the method of the present invention, rather than performing overhead tasks such as performing context switches, or creating, initializing, and terminating threads.

Part of the worker thread's asynchronous request indicates that, upon return of the results, a work item should be placed in the high priority work queue, thus causing a new worker thread to continue the function where the currently executing worker thread had left off.

The state diagram illustrated in FIG. 11 also applies to the receiver threads (e.g., thread 412, FIG. 4) and the reply threads (e.g., thread 416, FIG. 4). Typically, these threads perform I/O operations, and they operate asynchronously. Thus, they would not generally block. However, other conditions could cause a thread to block. The ability to program threads as state machines can be used to circumvent context switches for any type of potentially blocking request or condition.

After a worker thread is completed, and if its quantum has not expired, it is freed to execute another work item, if one is available. As will be explained below, if a worker thread performed a state change due to a potentially blocking request, the database manager places a new work item on the high priority work queue (e.g., queue 434, FIG. 4) after the requested results have been received. The work item is then picked up by a new worker thread. Unlike the prior art systems, the worker threads of the present invention will not enter a blocked state, and thus server resources are not unduly consumed by rescheduling events.

Figure 12:
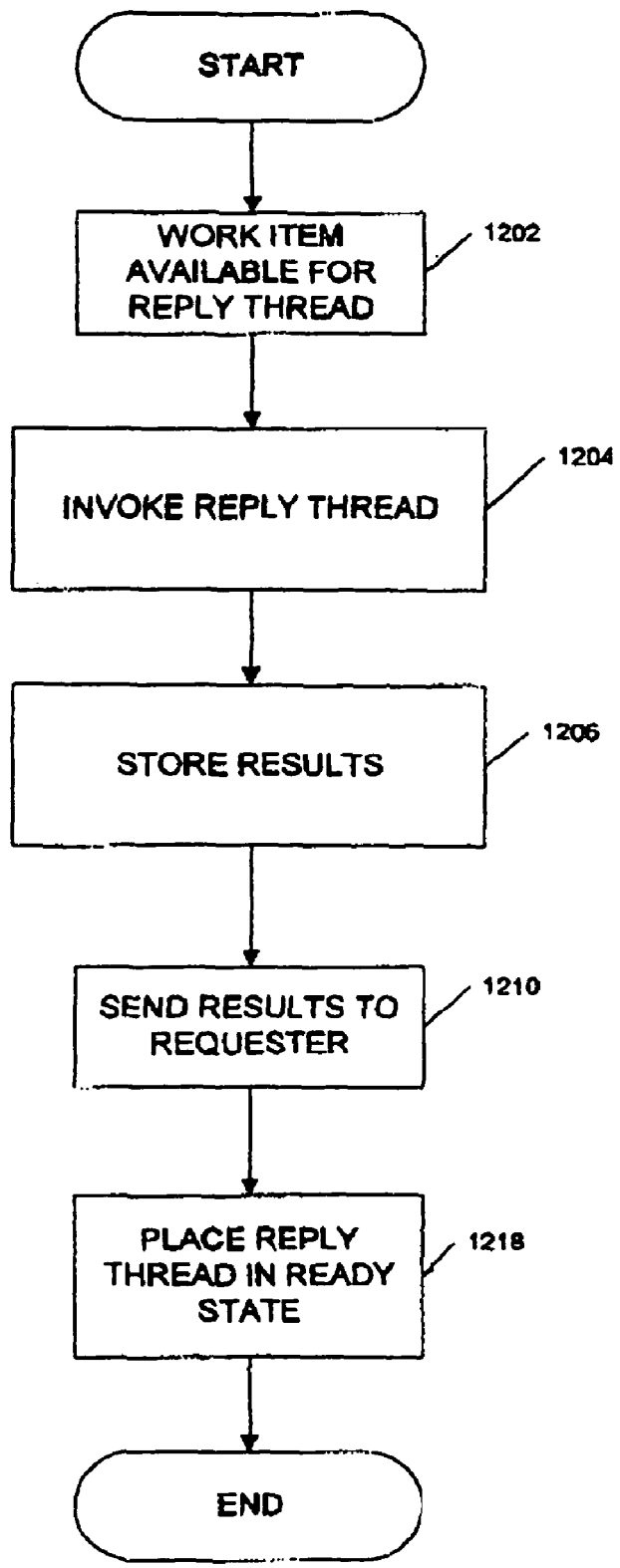
FIG. 12 illustrates a flowchart of a method for receiving results by a reply thread in accordance with one embodiment of the present invention.

FIG. 12 illustrates a flowchart of a method for returning results by a reply thread (e.g., thread 416, FIG. 4) in accordance with one embodiment of the present invention. The method begins, in block 1202, when the completion port queue (e.g., queue 422, FIG. 4) indicates that work is available for a reply thread.

At that time, the server schedules a reply thread for execution, in block 1204, unless a currently running thread is available to process the work. If necessary, when a CPU becomes available, the server loads the reply thread onto the CPU, and the reply thread begins executing. If no thread or CPU is available, the server can determine whether a running thread's quantum has expired, or whether a lower priority thread (e.g., thread 612, FIG. 6) is currently running. If so, the server can preempt the running thread by performing a context switch, and loading the next waiting thread on that CPU.

Once running, the reply thread can either send the results directly to the client, or can store them. In one embodiment, results may be stored in a partial results cache (e.g., cache 450, FIG. 4), as is explained in more detail in conjunction with FIG. 13, below. This cache could be located in system memory (e.g., memory 322, FIG. 3), such as RAM, for example. If the operation was to store data to a database, the results may be in the form of an indication that the storage was successful or unsuccessful. If the operation was to retrieve data from a database, all or a portion of those results should be located in the results queue (e.g., queue 444, FIG. 4).

The receiver thread sends all or a portion of the results stored in the results queue (e.g., queue 444, FIG. 4) to the requester, in block 1210. The thread is then placed back in the ready state, in block 1218, and the method ends.

Figure 13:
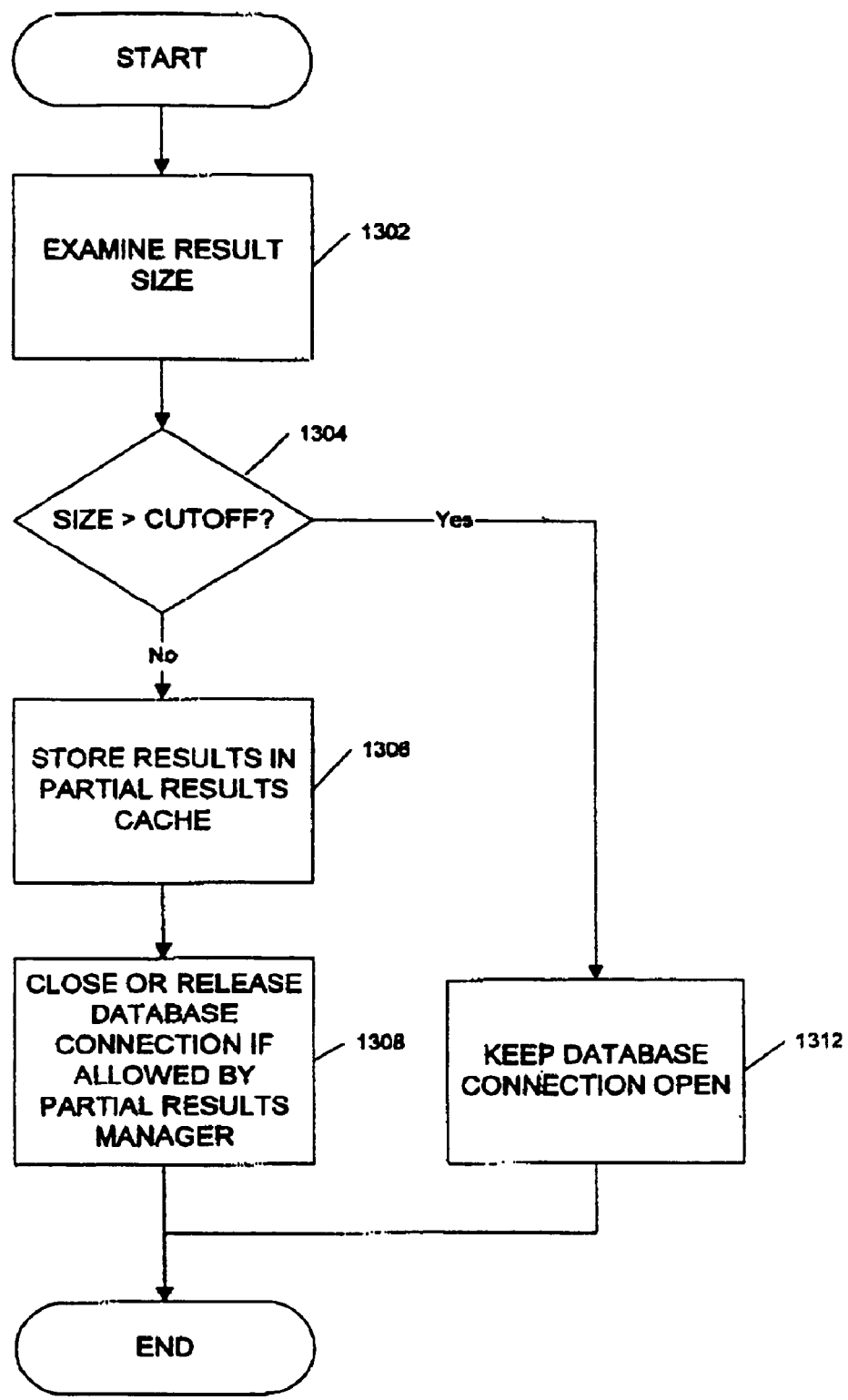
FIG. 13 illustrates a flowchart of a method for storing results in a partial results cache in accordance with one embodiment of the present invention.

FIG. 13 illustrates a flowchart of a method for storing results in a partial results cache in accordance with one embodiment of the present invention. In one embodiment, the server maintains one or more partial results caches, within which result sets of a certain size can be stored. Results can be generated by the server's threads, such as the worker threads or complex logic threads, or they can be received from a database or another computer, for example. When the results are received from a database, the use of the partial results caches enables the server to selectively accept an entire data set and close the associated database connection.

When an entire result set is stored in the partial results cache, future client requests for data in the result set can be met much more quickly, since the data is stored locally by the host computer. In one embodiment, only a small amount of data is sent to the client, and the server waits for the client to request more of the data. If the result set is too large, however, it is not stored in the partial results cache, the server accepts only part of the result set, and keeps the database connection open.

The size of each partial results cache can be a static value that is predetermined by the system administrator. Alternatively, the size of each partial results cache can be dynamic. For example, the size may be inversely proportional to server activity. When server activity is low, the cache size can be large, providing for the storage of large result sets. Inversely, when server activity is high, the cache size can be small, providing for the storage of only relatively small result sets.

Storing results begins, in block 1302, by the receiver thread examining the size of the entire result. The receiver thread then determines, in block 1304, whether the entire result's size is greater than a predetermined "cutoff" size. For example, a result set may be smaller than the size of a partial results cache, but it may not be desirable to fill the entire cache with that result. Therefore, the predetermined cutoff size would be some value that is less than the size of the partial results cache. In an alternate embodiment, the cutoff size could equal the partial results cache size.

Essentially, the partial results cache does two things, in one embodiment. First, it caches full content for small items, as described above. In addition, it manages the database connection for large content. This management is important, because the results can be timed out, and the database connection released. Thus, some entity must manage the process. In one embodiment, this management is done by the partial results manager.

If the result's size is not greater than the cutoff size, then the server stores, via one or more receiver threads, the entire result in a partial results cache, in block 1306. If the result set was received over a database connection, and the partial results manager releases the rowset (e.g., after all data was downloaded or after a timeout), then the database connection is closed or released, in block 1308.

In one embodiment, a partial results manager manages the partial results cache. The manager times out and deletes items in the cache when those items are not being accessed with sufficient frequency. If a request comes into the server for timed-out cache data, the partial reply manager and the client can negotiate to determine whether they will fail out the request, or go back to the database to reconstruct the deleted data.

If a result set received over a database connection is greater than the cutoff size, then the database connection is kept open, in block 1312, so that additional portions of the result can be received and sent to the requester.

As described in conjunction with FIG. 13, some result sets may be stored in a partial results cache, whether those result sets are generated by the server or received from a database or another computer. This cache provides quick access to the result set if a requester (e.g., a client computer) asks for more data within the result set. Instead of getting the data from the remote database, which could take a substantial amount of time, the data is retrieved from the partial results cache, and can be more quickly returned to the requester or provided to the function.

Figure 14:
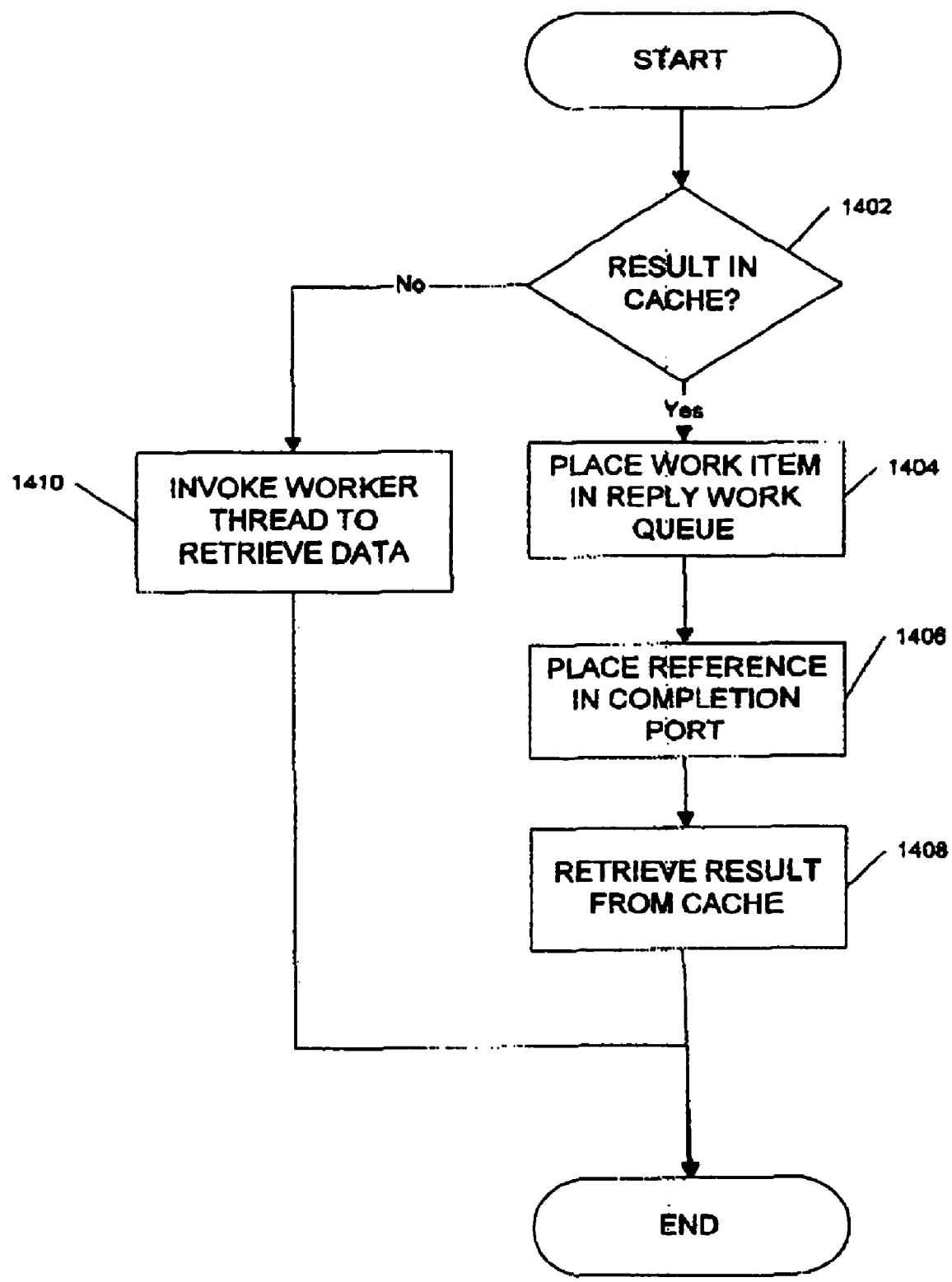
FIG. 14 illustrates a flowchart of a method for retrieving results from a partial results cache in accordance with one embodiment of the present invention.

FIG. 14 illustrates a flowchart of a method for retrieving results from a partial results cache in accordance with one embodiment of the present invention. The method begins, in block 1402, when a receiver thread determines whether a requested result has previously been stored in the partial results cache (e.g., cache 450, FIG. 4). If so, then in block 1404, the receiver thread places a work item in the reply work queue (e.g., queue 436, FIG. 4), and places a reference in the completion port queue, in block 1406, indicating that work is available for a receiver thread. The reply thread then retrieves the desired results from the cache, and sends them to the client, in block 1408, and the method ends. In another embodiment, the receiver thread may call into a partial results manager to process the partial results request, rather than placing a work item in the reply queue for a reply thread to execute.

If the results have not been stored in the partial results cache, then the receiver thread invokes a worker thread to go get the data, in block 1410, by posting a work item in the low priority work queue, and a reference in the completion port queue. The worker thread then initiates the process of retrieving the data from the database, as described previously. In another embodiment, the process fails if the results have not been stored in the partial results cache. The method then ends.

As described previously, in various embodiments, the method of the present invention reduces the likelihood that lengthy blocking conditions will occur, and also queues complex logic to be performed by complex logic threads. Thus, the system's threads and CPUs are more likely to be available for processing input/output requests than in prior art systems. Accordingly, implementation of the method of the present invention results in greater throughput and lower response times than prior art methods.

If the number of input/output work items on the high and low priority work queues becomes very large, however, a particular work item may wait in the queue for an unacceptable amount of time before being picked up by a thread. This condition would likely be reflected in longer than normal response times and lower throughput.

Figure 15:
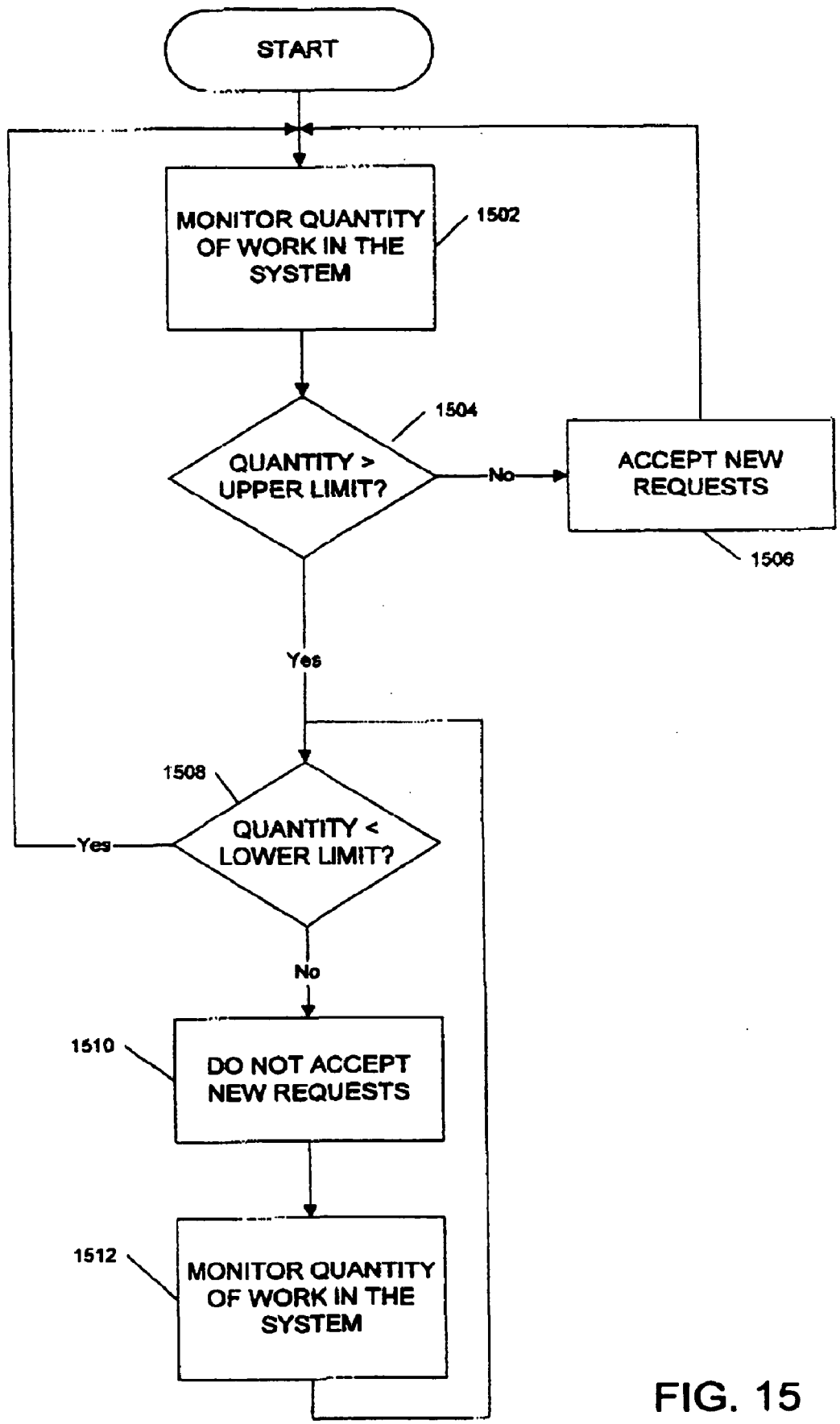
FIG. 15 illustrates a flowchart of a method for controlling the quantity of work being processed by the system in accordance with one embodiment of the present invention.
Figure 16:
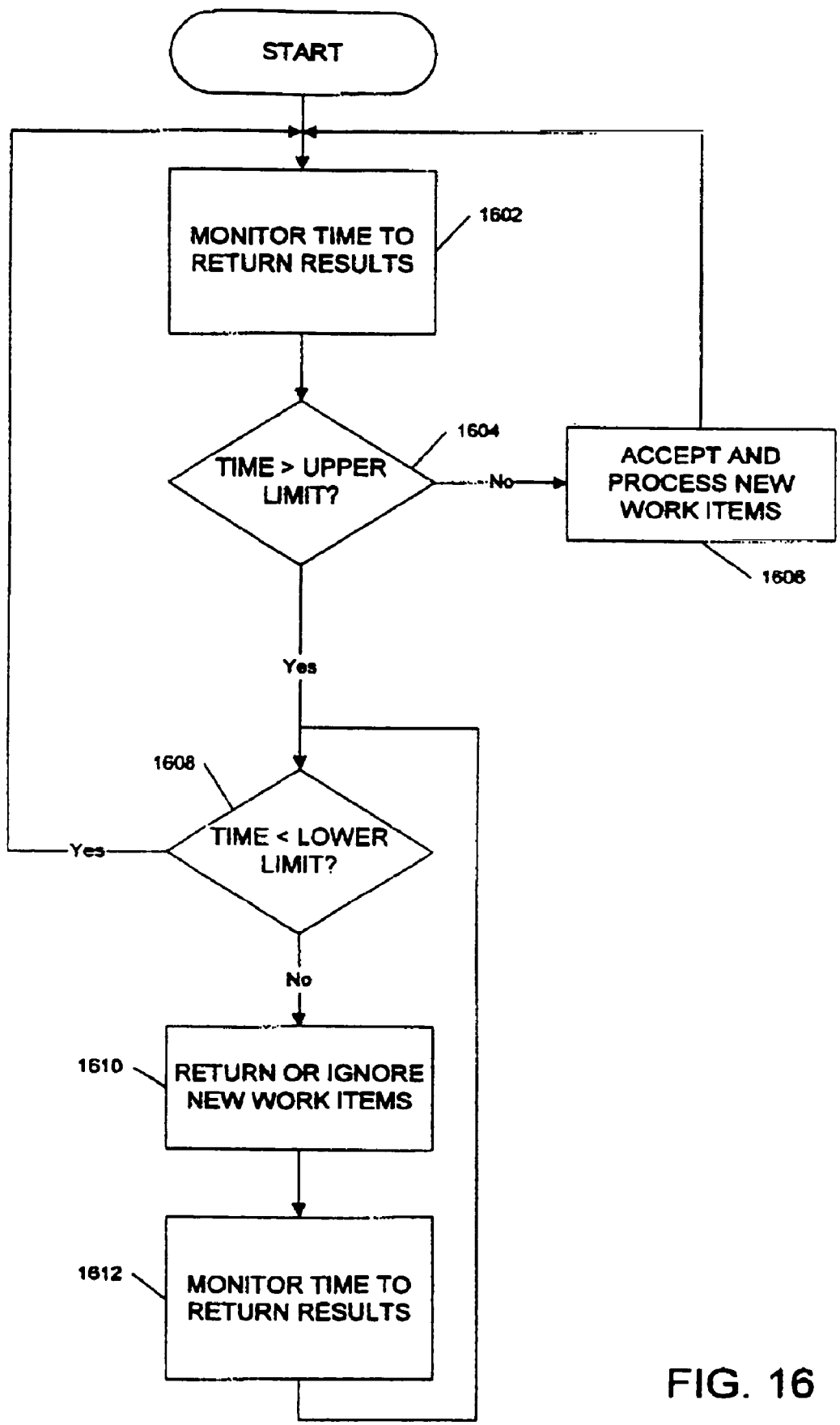
FIG. 16 illustrates a flowchart of a method for controlling the response time of the system in accordance with one embodiment of the present invention.

In one embodiment, the method of the present invention further improves server performance by monitoring the server workload and response time, and adjusting the server workload in order to keep server performance within an acceptable range. Conceptually, at times when the server is currently processing a large number of requests, the server concentrates on completing those requests before accepting new work into the system. FIGS. 15 and 16 illustrate the monitoring and control of server performance in accordance with one embodiment.

FIG. 15 illustrates a flowchart of a method for controlling the quantity of work being processed by the server in accordance with one embodiment of the present invention. The method begins, in block 1502, by monitoring the quantity of work currently in the server.

The quantity of work in the server can be quantified in several different ways. For example, the quantity of work could be measured in terms of the number of work items on the high and low priority work queues, and/or the number of server threads currently scheduled for execution. Other parameters also could be used to measure the quantity of work, such as the number of transactions/second, the number of server-related computations/second, the number of page reads/second, the number of page writes/second, and/or the number of cache hits/second.

In one embodiment, the server would be able to obtain any or all of the above statistics by making calls to the operating system (e.g., calls to the WINDOWS NT Performance Monitor). The server would also be capable of directly checking the number of items in various queues and memory locations. Other parameters that relate to a measurement of server performance also could be monitored. For ease of illustration, the number of work items in the work queues is used in this description as the measure of the quantity of work in the server.

In block 1504, a determination is made whether the quantity of work in the server exceeds an upper limit value. In one embodiment, the upper limit value is a predefined, static value that could be selected by a system administrator based on the number of system CPUs, CPU performance capabilities, system memory, and other factors. When the upper limit is a limit on the number of work items in the work queues, the upper limit will reflect the maximum, acceptable amount of time that it will take to execute any particular work item. When the quantity of work does not exceed the upper limit value, the server continues to accept new requests, in block 1506, and the procedure iterates as shown.

When the quantity of work has exceeded the upper limit value, the server will stop accepting new requests until the quantity of work falls below a certain lower limit. In one embodiment, the lower limit is a value that is lower than the upper limit, although the lower limit and upper limit could be equal in another embodiment. For example, the upper limit could be 100, indicating that new requests should be rejected if the number of items in the work queues exceeds 100 items. The lower limit could be 80, indicating that the server should not start accepting new requests until the number of items in the work queues drops below 80. This difference between the upper and lower limits gives the server a chance to fully recuperate from an overworked condition, thus avoiding a condition where the server rapidly toggles between accepting and rejecting new requests.

If the quantity of work has exceeded the upper limit, then in block 1508, a determination is made whether the quantity of work has yet dropped below the lower limit. If so, then the method iterates as shown in FIG. 15, continuing to monitor the quantity of server work and accept new requests until the quantity of work again exceeds the upper limit.

If the quantity of work has not yet dropped below the lower limit, then the server does not accept new requests, in block 1510. This can be done by sending a message back to the requester, for example, indicating that the server cannot process the request at that time. Alternatively, the server could simply allow a timeout to occur. In an alternate embodiment, the server could return or ignore new work items in the high or low priority work queues, rather than rejecting new requests. This is described in conjunction with FIG. 16, below.

In block 1512, the server continues to monitor the quantity of work in the server, and check whether the quantity of work has dropped below the lower limit. Until it does, the server will continue to reject new requests.

In one embodiment, the method illustrated in FIG. 15 is a continuous process that runs in parallel with other server activities. In other embodiments, the method could be executed periodically, in response to an interrupt, or in response to another system call.

Besides monitoring and adjusting the quantity of work in the server, the server also controls server performance, in one embodiment, by monitoring and controlling server response time. Response time is the time it takes to return the first portion of a result to a client. Therefore, response time also is a function of the amount of work in the server. It also is a function of the execution time for threads that are executing other work items in the work queue.

FIG. 16 illustrates a flowchart of a method for decreasing the work to reply ratio of the server in accordance with one embodiment of the present invention. The method begins, in block 1602, by monitoring the amount of time it takes to return results that have been received by the server to the client, once a work item has been placed in the completion port queue that indicates it is possible to send out received results.

In one embodiment, this amount of time is the sum of the time that the work item is in the completion port queue, the time the reply thread takes to post the data to the appropriate output port in the completion port, and the time to perform various other activities, such as context switches and thread scheduling and loading, among other things. The server would be able to obtain some or all of the above statistics by making calls to the operating system (e.g., calls to the WINDOWS NT Performance Monitor). For example, the server could request various thread-related performance counters, such as the amount of CPU time that each thread has consumed. In another embodiment, the server could timestamp the request when it is received. When the server replies to the request, the server could then determine how much time has elapsed.

In one embodiment, an average time to complete multiple reply work items is used to determine the approximate reply response time, since the number of items in the completion port work queue is always changing, and because each work item can take a different amount of time to complete. In another embodiment, the reply response time for only a single work item could be used.

In block 1604, a determination is made whether the response time exceeds an upper limit. In one embodiment, the upper limit value is a predefined, static value that could be selected by a system administrator based on the number of system CPUs, CPU performance capabilities, system memory, client preferences, and other factors. The upper limit reflects the maximum, acceptable amount of time that the server should take to respond to or complete any particular reply-related work item. When the response time does not exceed the upper limit value, the server continues to accept and process all work items, in block 1606, and the procedure iterates as shown.

When the response time has exceeded the upper limit value, the threads either return new work items to the completion port queue or ignore the new work items. This practice is continued until the response time falls below a certain lower limit. In one embodiment, the lower limit is a value that is less than the upper limit, although the lower limit and upper limit could be equal in another embodiment. For example, the upper limit could be 20 milliseconds, indicating that new work items should be returned or ignored if the response time exceeds 20 milliseconds. The lower limit could be 5 milliseconds, indicating that the server should again process all new work items when the response time drops below 5 milliseconds. This difference between the upper and lower limits gives the server a chance to fully recuperate from an out of tolerance condition, thus avoiding a condition where the server rapidly toggles between processing all work items and returning or ignoring new work items.

If the response time has exceeded the upper limit, then in block 1608, a determination is made whether the response time has yet dropped below the lower limit. If so, then the method iterates as shown in FIG. 16, continuing to monitor the response time and process new work items until the response time again exceeds the upper limit.

If the response time has not yet dropped below the lower limit, then the server returns or ignores new work items, in block 1610. Returning a work item can be done by sending a message back to the requester, for example, indicating that the server cannot process the request at that time. Alternatively, as a less desirable solution, the server could simply ignore the work item and allow a timeout to occur. In an alternate embodiment, the server could reject new requests, rather than returning or ignoring new work items already in the high or low priority work queues. This was described in conjunction with FIG. 14, above.

In block 1612, the server continues to monitor the response time, and check whether the response time has dropped below the lower limit. Until it does, the server will continue to return or ignore new work items.

In one embodiment, the method illustrated in FIG. 16 is a continuous process that runs in parallel with other server activities. In other embodiments, the method could be executed periodically, in response to an interrupt, or in response to another system call.

As described previously, another way that the server improves performance is by queuing complex business logic to be performed by lower priority threads (e.g., thread 426, FIG. 4) than the input/output worker threads (e.g., thread 434, FIG. 4). Because these threads have a lower priority than the worker threads, they may become CPU starved when the server is extremely busy with input/output requests. In one embodiment, these complex logic threads are guaranteed some minimum CPU resource.

Conclusion

Embodiments of the present invention provide a highly efficient, generic application server. Conceptually, the server utilizes multiple thread pools, each having a different function. By implementing a receiver thread pool, a worker thread pool, and a reply thread pool, the server provides the advantage of "total parallelism," meaning that work can simultaneously be brought into the server, processed, and results returned. In addition, in one embodiment, the server uses a complex logic thread pool to perform logical functions, thus efficiently using the available CPU resources for other services.

An application developer is required to write only three types of reply handlers, in one embodiment: receiver handlers; worker handlers; and reply handlers. Thus, it is relatively easy for the developer to create new applications using the method and server of the present invention.

The worker threads are implemented as state machines, in one embodiment. Thus, any potentially blocking request is issued asynchronously, resulting in a state transition and the freeing up of the CPU and the worker thread. In addition, the implementation of the threads as state machines creates an asynchronous boundary between the work queue and the database manager. This enables application logic to be written independently of whether the database is a synchronous or an asynchronous database.

In one embodiment, work items corresponding to new requests are placed on a low priority work queue, and work items corresponding to functions further along in processing are placed on a high priority work queue. By implementing multiple priority levels, functions further along in processing are worked on first, thus facilitating completion of those functions and freeing up of server resources.

In order to control the quantity of work accepted and the server throughput, one embodiment of the method of the present invention uses one or both of two throttling functions. The first function controls how much work the server will perform at any particular time. The second throttling function controls the server response time. When the quantity of work or the response times are out of limits, the server devotes its resources to completing active requests, rather than servicing new requests.

Several types of caches are also used to enhance the scalability of the server. First, a partial results cache stores relatively small result sets in local memory. For database applications, this enables the corresponding database connection to be closed, and the client to receive faster access to data within the result set. In addition, one or more first-in, first-out (FIFO) queues are implemented between the various thread pools. These provide expansion mechanisms, which as buffers as the thread states are asynchronously adapting.

In the foregoing detailed description, reference is made to the accompanying drawings, which form a part hereof, and in which are shown by way of illustration specific embodiments in which the invention may be practiced. These embodiments are described in sufficient detail to enable those skilled in the art to practice the invention.

It will be appreciated by those of ordinary skill in the art that any arrangement that is calculated to achieve the same purpose may be substituted for the specific embodiment shown. For example, illustrative embodiments describe an implementation of the invention using threads and calls to various operating system functions. However, those skilled in the art will recognize, based on the description herein, that the method and apparatus of the present invention could be used in the context of several different types of operating systems, including operating systems based on WINDOWS, UNIX, DOS, MVS, VM, Macintosh, OS/2, and other operating systems now or hereafter in existence.

The foregoing detailed description uses terms that are provided in order to make the detailed description more easily understandable. It is to be understood that these terms and the phraseology employed in the description should not be construed to limit the scope of the invention.

This application is intended to cover any adaptations or variations of the present invention that fall within its scope. The foregoing detailed description is, therefore, not to be taken in a limiting sense, and it will be readily understood by those skilled in the art that various changes in the details, materials, and arrangements of the parts and steps which have been described and illustrated in order to explain the nature of this invention may be made without departing from the spirit and scope of the invention as expressed in the adjoining claims.

What is claimed is:

1. A method in a computer system for servicing requests from multiple client computers, the method comprising:
receiving a request from a client computer to perform a multi-state function;
performing a first task, by a first work handler invoked by a first thread in a ready state, wherein the first task is associated with a first state of the multi-state function, and performing the first task includes issuing an asynchronous request for data to a database manager;
storing the data in an input queue;
placing the first thread back in the ready state;
receiving the data specified in the asynchronous request;

performing a second task, by a second work handler invoked by a second thread in the ready state, wherein the second task is associated with a second state of the multi-state function, and the second task performs an operation on the data and generates a result;

storing the result in a results queue distinct from the input queue;

determining whether the result is larger than a threshold;

if the result is not larger than the threshold, then storing the result in a partial result cache and attempting to close a database connection; and if the result is larger than the threshold, then storing the result in a partial result cache and maintaining the database connection.

2. The method as claimed in claim 1, further comprising:

processing the request by a receive handler invoked by a third thread;

creating a work item that specifies the first task; and placing the work item in a work queue that is accessible to the first thread.

3. The method as claimed in claim 2, wherein the first thread, the second thread, and the third thread are all identical generic threads within a pool of generic threads.

4. The method as claimed in claim 2, wherein placing the work item in the work queue comprises placing the work item in a low priority work queue, the method further comprising:

placing a second work item that specifies the second task on a high priority work queue;

a work handler looking for a work item first on the high priority work queue; and if no work item exists on the high priority work queue, the work handler looking for the work item on the low priority queue.

5. The method as claimed in claim 1, wherein the asynchronous request is a request that would otherwise cause the first thread to block.

6. The method as claimed in claim 5, wherein the asynchronous request is a request for data from a disk.

7. The method as claimed in claim 1, further comprising:

the database manager placing the asynchronous request on a pending queue; and when the data is received, placing a work item associated with the second state on a work queue.

8. The method as claimed in claim 7, wherein the work queue is a high priority work queue, the method further comprising:

placing a first work item that specifies the first task on a low priority work queue;

a work handler looking for a work item first on the high priority work queue; and if no work item exists on the high priority work queue, the work handler looking for the work item on the low priority work queue.

9. The method as claimed in claim 2, wherein the first thread, the second thread, and the third thread are all identical generic threads within a pool of generic threads.

10. The method as claimed in claim 1, further comprising:

performing additional tasks associated with subsequent function states by additional work handlers invoked by one or more additional threads;

at least some of the additional work handlers issuing additional asynchronous requests; and placing threads associated with the at least some of the additional work handlers back in the ready state after issuing the additional asynchronous requests.

* * * * *